United States Patent
Klemmer

(10) Patent No.: US 11,031,978 B2
(45) Date of Patent: Jun. 8, 2021

(54) DETECTION AND RANGING USING MULTI-RADIO MOBILE DEVICES

(71) Applicant: Samsung Electronics Co., Ltd., Suwon-si (KR)

(72) Inventor: Nikolaus Klemmer, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/404,648

(22) Filed: May 6, 2019

(65) Prior Publication Data

US 2020/0119780 A1    Apr. 16, 2020

Related U.S. Application Data

(60) Provisional application No. 62/746,084, filed on Oct. 16, 2018.

(51) Int. Cl.
| | |
|---|---|
| *H04B 7/0417* | (2017.01) |
| *H04L 5/00* | (2006.01) |
| *H04B 7/06* | (2006.01) |
| *G01S 5/02* | (2010.01) |
| *H04W 64/00* | (2009.01) |

(52) U.S. Cl.
CPC .......... *H04B 7/0421* (2013.01); *G01S 5/0284* (2013.01); *H04B 7/0602* (2013.01); *H04L 5/0007* (2013.01); *H04W 64/003* (2013.01)

(58) Field of Classification Search
CPC ......... H04L 2025/03426; H04L 25/067; H04L 1/0054; H04L 27/38; H04L 25/0204
USPC ........................................................ 375/262
See application file for complete search history.

(56) References Cited

U.S. PATENT DOCUMENTS

| | | | |
|---|---|---|---|
| 8,257,189 B2 * | 9/2012 | Koudele ............... | A63B 43/00 473/155 |
| 9,569,003 B2 | 2/2017 | Rofougaran et al. | |
| 2003/0151541 A1 * | 8/2003 | Oswald .................. | G01S 13/46 342/70 |

(Continued)

FOREIGN PATENT DOCUMENTS

| | | |
|---|---|---|
| JP | 2005-151300 A | 6/2005 |
| JP | 2017-135503 A | 8/2017 |

OTHER PUBLICATIONS

"Project Soli", Google Inc., copyright 2019, 7 pages. https://atap.google.com/soli/.

(Continued)

*Primary Examiner* — Shuwang Liu
*Assistant Examiner* — Gina M McKie

(57) ABSTRACT

A mobile electronic device includes a plurality of radio frequency (RF) antennas and a processor. RF antennas are configured to transmit (TX) or receive (RX) a RF signal. The processor is configured to configure one RF antenna, among the plurality of RF antenna, as a TX antenna and remaining RF antennas as RX antennas, cause the TX antenna to transmit the RF signal, cause the RX antennas to receive portions of the RF signal, the portions reflected from an object, calculate each of flight times of the RF signal with respect to each of the RX antennas, and identify a location of the object based on each of flight times of the RF signal, wherein each of the plurality of RF antennas is reconfigurable as the TX antenna or the RX antennas. A method for operating a mobile device is also provided.

20 Claims, 16 Drawing Sheets

(56) References Cited

U.S. PATENT DOCUMENTS

| | | | |
|---|---|---|---|
| 2012/0032855 A1* | 2/2012 | Reede | G01S 5/0289 |
| | | | 342/458 |
| 2012/0299785 A1 | 11/2012 | Bevelacqua | |
| 2013/0113993 A1 | 5/2013 | Dagit, III | |
| 2014/0148196 A1* | 5/2014 | Bassan-Eskenazi | ......................... |
| | | | G06K 7/10297 |
| | | | 455/456.1 |
| 2015/0362581 A1* | 12/2015 | Friedman | G01S 13/767 |
| | | | 455/456.1 |
| 2016/0344456 A1 | 11/2016 | Prendergast et al. | |

OTHER PUBLICATIONS

"How It Works", Elliptic Laboratories A/S, copyright 2019, 6 pages. https://www.ellipticalabs.com/how-it-works/.

"Products", Elliptic Laboratories A/S, copyright 2019, 7 pages. https://www.ellipticlabs.com/products/.

Chi et al., "Complementary Waveforms for Sidelobe Suppression and Radar Polarimetry", in: Principles of Waveform Diversity and Design, Ch. C-XV-1, Colorado State University Department of Electrical and Computer Engineering, Jan. 2010, 19 pages.

Levanon, "Multifrequency complementary phase-coded radar signal", IEE Proceedings—Radar, Sonar and Navigation, vol. 147, No. 6, Dec. 2000, pp. 276-284.

Norman, "Comments of Facebook, Inc. Re: Request by Google LLC for Waiver of Sect. 15.255(c)(3)", FCC ET Docket No. 18-70, Jul. 2018, 15 pages.

Han et al., "Joint wireless communication and radar sensing systems—state of the art and future prospects", IET Microwaves, Antennas & Propagation, vol. 7, No. 11, Aug. 2013, pp. 876-885.

Kumari et al., "Sparsity-Aware Adaptive Beamforming Design for IEEE 802.11ad-based Joint Communication-Radar", 2018 IEEE Radar Conference (RadarConf18), Apr. 2018, pp. 0923-0928.

Garmatyuk et al., "Feasibility Study of a Multi-Carrier Dual-Use Imaging Radar and Communication System", Proceedings of the 4th European Radar Conference, Oct. 2007, pp. 194-197.

Kumari et al., "Investigating the IEEE 802.11ad Standard for Millimeter Wave Automotive Radar", 2015 IEEE 82nd Vehicular Technology Conference (VTC2015-Fall), Sep. 2015, 5 pages.

Kumari et al., "IEEE 802.11ad-Based Radar: An Approach to Joint Vehicular Communication-Radar System", IEEE Transactions on Vehicular Technology, vol. 67, No. 4, Apr. 2018, 35 pages.

International Search Report dated Jan. 28, 2020 in connection with International Patent Application No. PCT/KR2019/013553, 3 pages.

Written Opinion of the International Searching Authority dated Jan. 28, 2020 in connection with International Patent Application No. PCT/KR2019/013553, 5 pages.

* cited by examiner

DETECTION AND RANGING USING MULTI-RADIO MOBILE DEVICES

CROSS-REFERENCE TO RELATED APPLICATION AND CLAIM OF PRIORITY

This application claims priority under 35 U.S.C. § 119(e) to U.S. Provisional Patent Application No. 62/746,084 filed on Oct. 16, 2018. The above-identified provisional patent application is hereby incorporated by reference in its entirety.

TECHNICAL FIELD

The present application relates generally to detection and ranging using multi-radio mobile devices. In particular, the present disclosure relates to providing ranging capabilities by taking advantage of a larger number of antenna modules.

BACKGROUND

An early example of integrated radar and communication subsystem can be traced back to the NASA Space Shuttle Orbiter, where a Ku-band radio was either operated as a radar during rendezvous maneuvers or as a 2-way ground-to-shuttle communications system. The first OFDM radar (referred to as Multi-Carrier Phase-Coded (MCPC) radar) was not originally motivated by the possibility of simultaneous communication and radar capabilities, it was however later recognized as a viable option for combination with OFDM communications. The use of 802.11ad WiFi for radar appears to have been proposed in 2015. Current embodiments of this idea focus on monostatic radars, with or without antenna arrays for angular resolution.

Ongoing interest appears to be driven by the trend towards intelligent transportation and autonomous vehicles, their need for situational awareness, and the advantages that can be gained from vehicle-to-vehicle (V2V) communication. Joining communication and radar functionality potentially removes the need for separate radios for both. For the vehicular use case with attention to long range, it is claimed that a single target can be located at up to 200 m range while Gb/s data rates are achieved simultaneously. Angular resolution from the low number of antenna elements in commercial 802.11ad modules is not sufficient, however.

SUMMARY

The present disclosure provides 3-dimensional, short-distance ranging to mobile devices, without the requirement for dedicated hardware components beyond what is already available in 5G mmW or 802.11ad enabled devices.

The ranging capability may be used for gesture recognition in close distance to the device, for depth sensing at longer distances, liveliness detection, detection of bio-signals that have a range-component, such as breathing and heartbeat, or to increase the sensing quality when combining camera images with depth information.

In a first embodiment, a mobile electronic device is provided. The mobile electronic device includes a plurality of radio frequency (RF) antennas and a processor. The plurality of radio frequency (RF) antennas are configured to transmit (TX) or receive (RX) a RF signal. The processor is configured to configure one RF antenna, among the plurality of RF antennas, as a TX antenna and remaining RF antennas as RX antennas, cause the TX antenna to transmit the RF signal, cause the RX antennas to receive portions of the RF signal, the portions being reflected from an object, calculate each of flight times of the RF signal with respect to each of the RX antennas, and identify a location of the object based on each of flight times of the RF signal, wherein each of the plurality of RF antennas is reconfigurable as the TX antenna or the RX antennas.

In a second embodiment, a method for operating a mobile device comprising a plurality of RF antennas configured to transmit (TX) or receive (RX) a RF signal is provided. The method includes configuring one RF antenna, among the plurality of RF antennas, as a TX antenna and remaining RF antennas as RX antennas. The method also includes causing the TX antenna to transmit the RF signal, causing the RX antennas to receive portions of the RF signal, the portions being reflected from an object. The method further includes calculating each of flight times of the RF signal with respect to each of the RX antennas and identifying a location of the object based on each of flight times of the RF signal. Each of the plurality of RF antennas is reconfigurable as the TX antenna or the RX antennas.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 18, discussed herein, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

Figure 1:
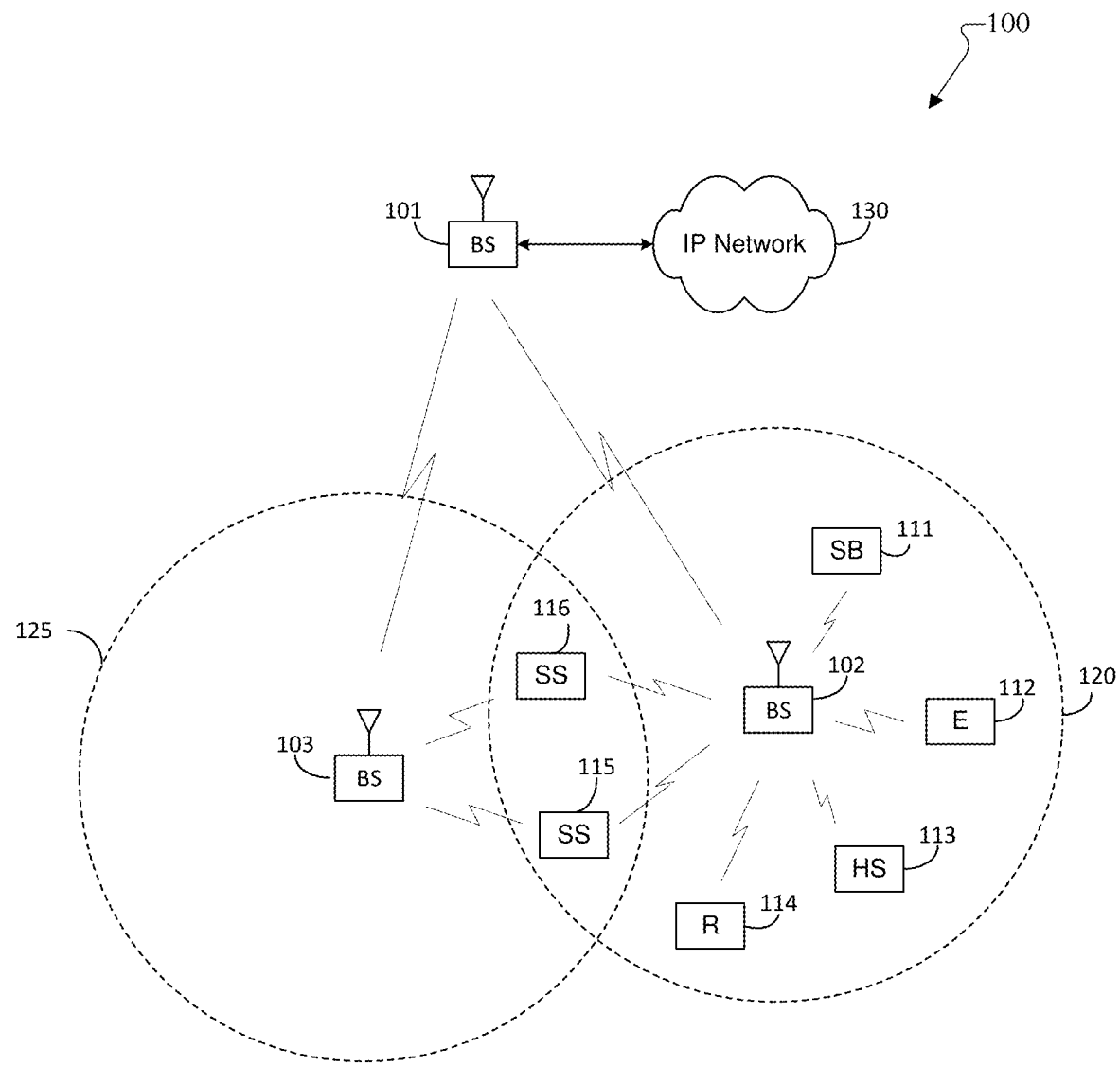
FIG. 1 illustrates an example wireless network according to embodiments of this disclosure.

FIG. 1 illustrates an example wireless network 100 according to one embodiment of this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of this disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
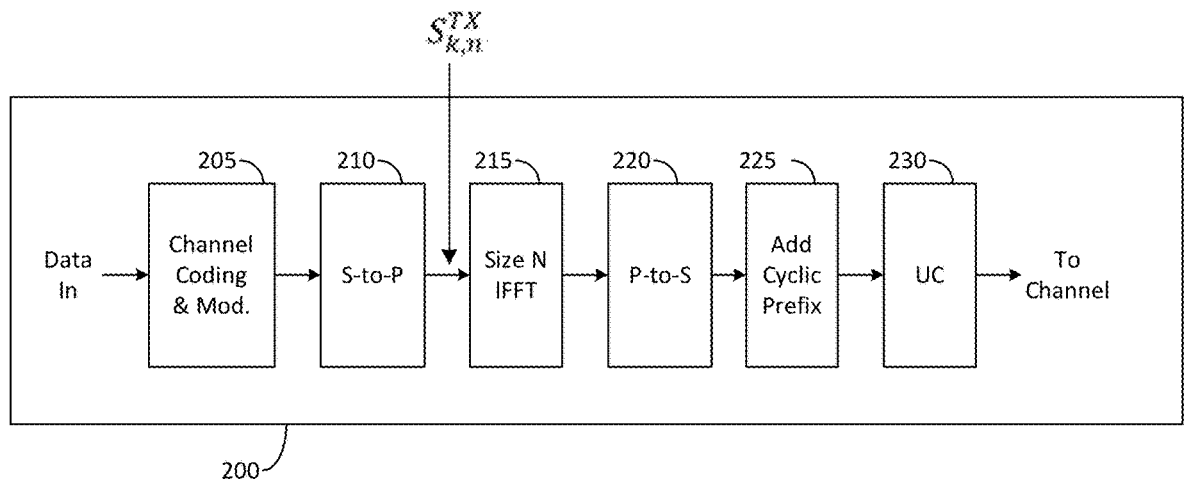
FIGS. 2A and 2B illustrate example wireless transmit and receive paths according to one embodiment of this disclosure.
Figure 2B:
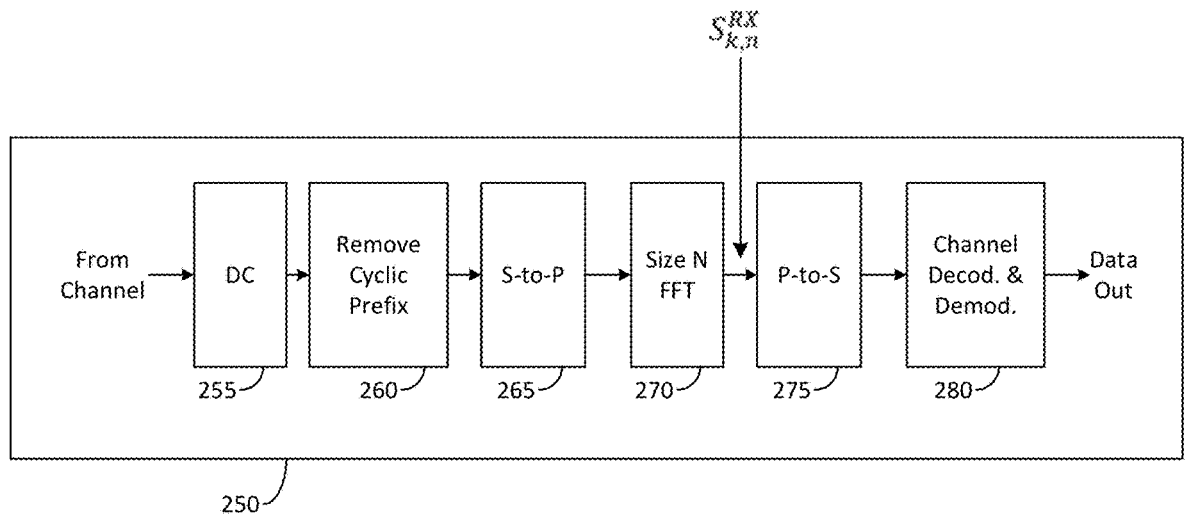

FIGS. 2A and 2B illustrate example wireless transmit and receive paths according to one embodiment of this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of this disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
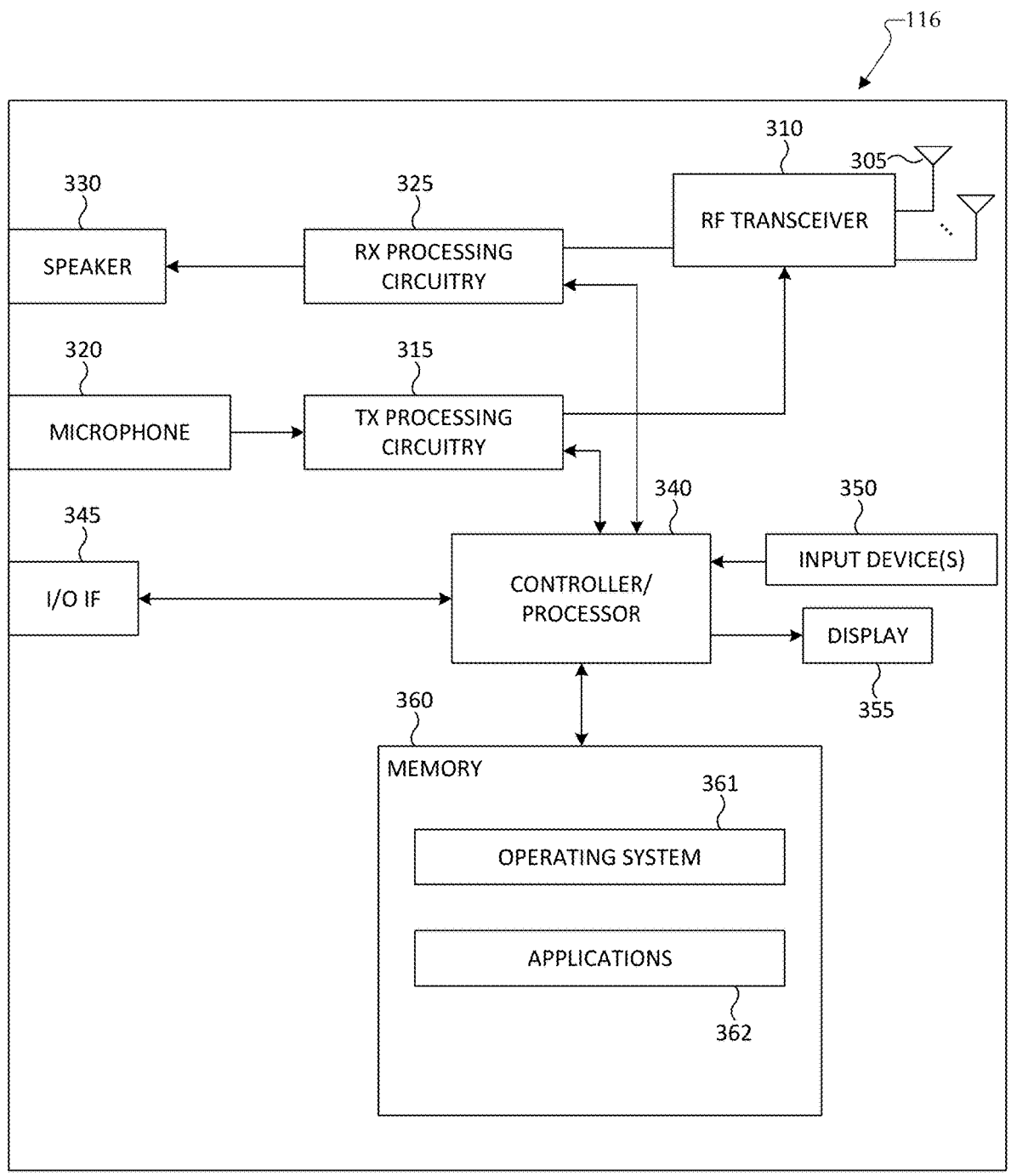
FIG. 3 illustrate an example UE capable of millimeter (mm)-wave communications according to one embodiment of this disclosure.

FIG. 3 illustrates an example UE 116 capable of milli-meter (mm)-wave communications according to one embodiment of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of this disclosure as described in embodiments of this disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM). Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
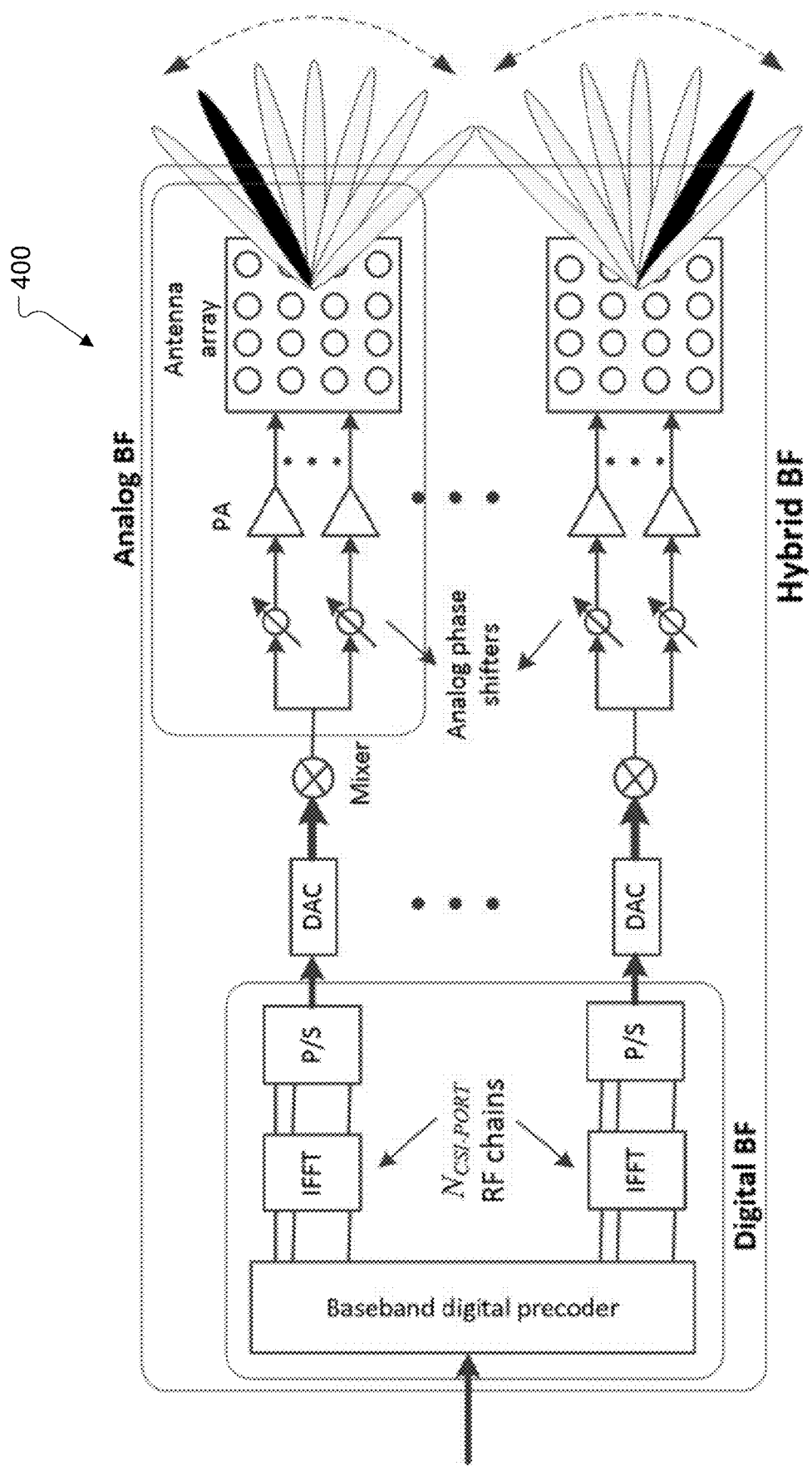
FIG. 4 illustrates an exemplary mm-wave communication system according to embodiments of this disclosure.

FIG. 4 illustrates an exemplary mm-wave communication system according to embodiments of this disclosure. The embodiment shown in FIG. 4 is for illustration only. Other embodiments are used without departing from the scope of this disclosure.

For mm-Wave bands, the number of antenna elements can be large for a given form factor due to the small wavelengths of the signal. The physical extent of antenna elements generally scales with the wavelength associated with the intended communication frequency band and typically falls in the range between ½ to 1 wavelength in either dimension. As an example, planar antenna elements for use in the common 28 GHz or 60 GHz frequency bands will typically occupy an area of (½ wavelength)-squared, or approximately 5.4×5.4 mm$^2$ (28 GHz) or 2.5×2.5 mm$^2$ (60 GHz). Small arrays of such antennas are compatible with the physical constraints of handheld mobile devices and are used to the enable Gbps-level high-throughput communications at the mm-wave frequencies.

The number of digital chains is limited due to constraints on hardware size, power consumption and implementation cost, which differ between mobile device and base station. In one embodiment, it is advantageous and customary that one digital chain be mapped to a large number of antenna elements which can be controlled by a bank of analog phase shifters. One digital chain then connects to one sub-array which produces a narrow analog beam through analog beamforming. As a general rule, the angular beam-width of a square N-element array, fed by coherent electrical signals, is on the order of $\sqrt{\pi/N}$ [rad]. The center-peak of this analog beam can be pointed to or swept across a wide range of angles by selectively delaying element signals relative to each other, typically by adjusting a bank of phase shifters. For clarity, FIG. 4 only shows the signal path in transmit direction. It is readily understood by those skilled in the art that the signal paths will also include hardware in receive direction (from antennas to digital output via low-noise amplifiers, phase shifters, mixers, analog-to-digital converters, and FFT blocks).

Mobile devices, particularly hand-held smart phones pose additional challenges in that (1) the orientation of the device relative to the base station and (2) the signal path loss between any one antenna module and the base station are not known. A common approach to mitigate these issues is to provide several antenna arrays with different physical placements and orientations on the mobile device, such that e.g. blockage of one or few of the modules by e.g. the users hand or body can be mitigated by enabling one or several of the other modules.

Figure 5:
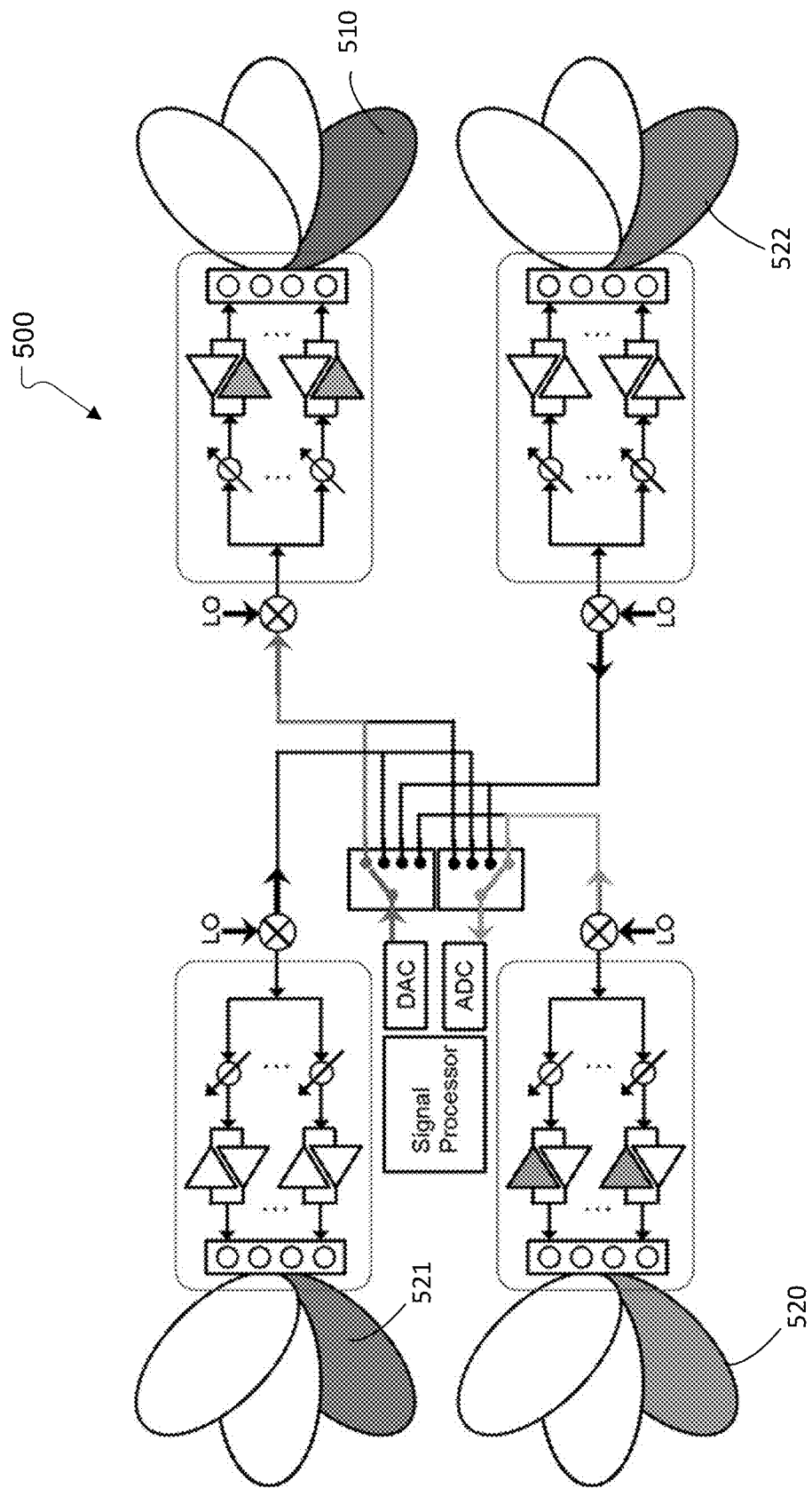
FIG. 5 illustrates an exemplary multi-module analog signal path configuration for mobile device mm-wave communications according to one embodiment of this disclosure.

FIG. 5 illustrates an exemplary multi-module analog beamforming for mobile device mm-wave communications according to one embodiment of this disclosure. The embodiment shown in FIG. 5 is for illustration only. Other embodiments are used without departing from the scope of this disclosure.

Architecturally, a straightforward approach to low-complexity implementations of mm-wave communications systems with dynamically configurable front-end modules is shown in FIG. 5. At any given time, one 510 of 4 modules can be in transmit mode and at least one of the remaining 3 modules 521, 522, 523 can be in receive mode. Other, more complex methods are possible that allow simultaneous transmission or reception from more than one module, but not the same due to lack of antenna isolation, mostly. In a maximum configuration, the system may be designed to allow transmission and reception through part or all of modules simultaneously. Considering power consumption and hardware complexity scale accordingly, the system might be designed to have the minimum switched configuration.

In one embodiment, there are very few elements per each module, such as 4 antenna elements. Realizable angular (half power-) beam widths from 4 elements are on the order of 25 deg. to 50 deg. While this is advantageous for the good spatial coverage in the mobile use case, it also means that any signal arriving e.g. at a receiver module cannot be assigned an accurate Direction-of-Arrival (DoA) value.

In radar systems, considerable effort has been applied to the topic of the ideal radar waveform. While simple pulsed radar was used for early implementations and radar functionality is intuitive in this case, increased range resolution requires shorter pulses, and shorter pulses contain less energy, which reduces detection range. As a first improvement, the frequency modulation continuous wave (FM-CW) radar waveform was introduced. Here, a linear frequency ramp is transmitted that sweeps across a bandwidth B centered about a carrier frequency. A transmitter, conventionally using a dedicated antenna emits a chirp signal towards the target(s), which reflect some of the signal and a delayed copy appears at the (one or multiple) receiver antenna(s). This radar signal contains significantly more energy as power is transmitted for the duration of the chirp. Higher performing waveforms in terms of resolution, range-doppler ambiguity, and interference robustness employ orthogonal codes in conjunction with phase modulation and correlation methods for radar pulse compression. Pulse compression is done in the digital domain and uses the distinct autocorrelation properties of the code sequences.

While the required special autocorrelation-property code sequences may be present in various communication physical layer standards, their use is governed by the need of the particular communications protocol and may not fit the radar purpose. For example, the codes may not be sent frequently enough, or not through a sufficient number of subcarriers (bandwidth) to yield the required ranging resolution and update rate.

Alternatively, the delay-time profile of the target reflection(s) is derived from a frequency domain measurement, similar to what is customary in a variant of Time-Domain-Reflectometry (TDR). In this type of TDR, the amplitude and phase response of reflections from a device-under-test (e.g. a damaged cable) are measured with a vector network analyzer (VNA) over a particular frequency range and the time domain reflection profile is computed via an inverse FFT.

Consider an ongoing OFDM transmission across a large number N of sub-carriers across a total bandwidth (B=NΔf). Preferably, the sub-carriers span the entire channel bandwidth (for best range resolution) without un-used gaps during a radar "frame" period. We assume that any relevant target-reflected signals arrive at the receiver with a delay spread no larger than the OFDM cyclic prefix duration. As a result, for every sub-carrier n (n=0 . . . N−1) and symbol period k (t=k*$T_S$), the amplitude & phase of the received signals $S_{k,n}^{RX}$ can be normalized to the amplitude & phase of the associated transmitted signals $S_{k,n}^{TX}$. This effectively samples the frequency-domain channel response $H_n$=H($f_n$) at the occupied sub-carrier frequencies once per symbol period:

$$H_n = \frac{S_n^{RX}}{S_n^{TX}}, \text{ at the sub-carrier frequencies } f_n.$$

The receive samples need to be taken before the channel equalization step in the OFDM receiver. The sampled time domain response is then obtained as the inverse FFT:

$$h_k \sim \sum_{n=0}^{N-1} H_n \exp(j2\pi(n/N)k), \text{ at the time-instances } t_k = (k/N)T_S.$$

With $T_S$=1/Δf and B=NΔf, time samples of the channel response are spaced by Δt=($t_{k+1}$−$t_k$)=1/B which leads to a range resolution ΔR=cΔt/2=c/2B, again. Here, c is the speed of light and B is a bandwidth.

The clear advantage of this approach to radar using OFDM modulated communication is that it makes no specific assumption about autocorrelation or any other properties of the signal, except that the subcarriers should be filled with valid (i.e. sufficient amplitude) signals. Since subcarriers are dynamically assigned and may not all be populated simultaneously, the channel response can be averaged over symbol periods with non-zero sub-carrier powers, as long as sufficient measurement time (radar frame duration) is available. Hence, this radar approach can be taken in the context of 5G NR communications without interfering with communications in the cell.

In contrast to mono-static radars with co-located, synchronized transmitters and receivers, bi- or multi-static radars have two or more locations with receivers and transmitters.

Figure 6:
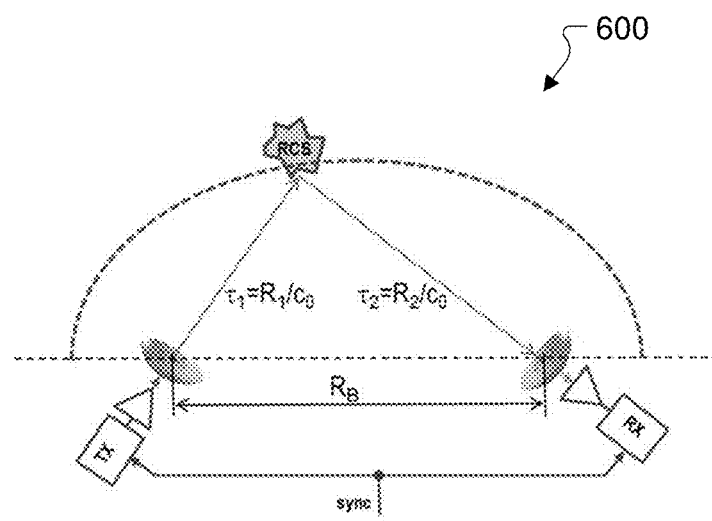
FIG. 6 illustrates an exemplary bi-static radar mechanism according to one embodiment of this disclosure.

FIG. 6 illustrates an exemplary bi-static radar mechanism 600 according to one embodiment of this disclosure. Without TX/RX synchronization, the receiver will derive its time reference from the direct-path (meaning a shortest delay) signal and refer all other, more delayed signals to targets. Assuming the distance between a TX-RX pair is known, in the absence of angle information, the time-of-arrival difference between the direct and reflected paths defines the target location(s) on the surface of an ellipsoid, i.e. the surface that is obtained by rotating an ellipse around its major axis, with the TX and RX at the foci. In that sense, a mono-static radar is a special case of a bi-static radar with the constant delay surface degenerated to a sphere.

Figure 7:
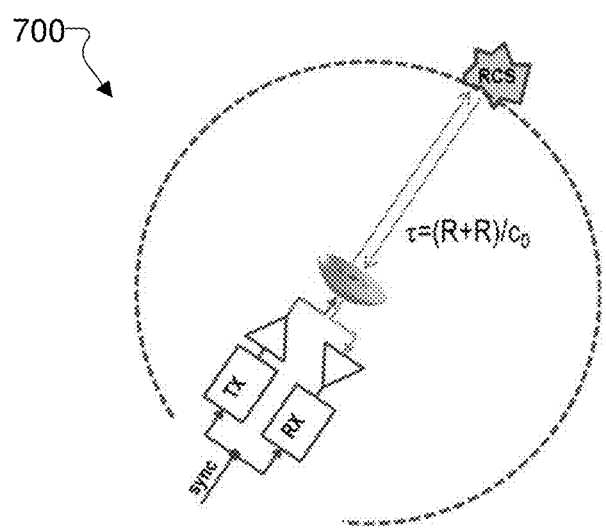
FIG. 7 illustrates an exemplary mono-static radar mechanism according to one embodiment of this disclosure.

FIG. 7 illustrates an exemplary mono-static radar mechanism 700 according to one embodiment of this disclosure. For large target distances, the equi-range ellipsoid degenerates into a sphere. If the TX-RX base distance is small enough, direct electrical synchronization similar to the monostatic case is practical and reliance of a direct path (which may be strongly attenuated or in an angular region of low antenna gain) is not needed. In this case, the arrangement is generally referred to a coherent multi-static radar.

It is evident that the mono-static round trip distance variable 2R will be replaced by the total propagation length or bistatic range ($R_1$+$R_2$). Resolution limitations apply to this total path length. TX and RX antenna apertures may be different, in general. In the radar equation, the 1/$R^4$ distance dependence will be replaced by 1/($R_1^2 R_2^2$), in analogy.

Also note that the reflected signal is no longer from a direct reflection and hence the observed radar cross section will differ from the mono-static case. For small to moderate bistatic angles (between TX and RX propagation directions), the RCS is approximately that of the bisector between TX and RX directions and lower than for the monostatic case. For large bistatic angles, RCS equals that of an equivalent shadow-area aperture with the associated roll-off angular pattern and a value approximately equal to the monostatic RCS. For angles approaching 180 deg., the direct TX-RX path will likely dominate, possibly leading to a jammed RX without discernable signal. Hence, we expect that the bistatic radar produces substantially new information when the base-distance is comparable to the individual path lengths.

If TX and/or RX have angular elevation resolution in addition to time delay, the target location can be narrowed down from the ellipsoid surface to the path obtained from the intersect of the ellipsoid with the plane spanned by the constant-elevation arc. If there is angular azimuth resolution also, then the target can be located as a point on the ellipse for full 3D resolution.

As discussed above, fine angular resolution requires large antenna aperture areas with correspondingly large number of antenna elements, both of which are not compatible with integration into handheld consumer devices. Methods to resolve the target location without reliance on Direction-of-Arrival (DoA) information are available.

In the Time-of-Arrival (ToA) method, there are several receivers and at least one transmitter at known locations. As will become apparent, this method is also referred to as "elliptic positioning". Receivers and transmitter are synchronized to a common time reference. For large physical distances, synchronization can be accomplished via the direct-path TX-RX signals, or, when the stations are close, time-synchronization can be done via electrical connection. To determine the target location unambiguously in an N-dimensional space, at least N independent range measurements are necessary.

In the main case of interest here, each RF module at location can be configured into either TX or RX mode. When n modules are available, a total of $$C_{n,2} = \binom{n}{2} = \frac{n!}{2! * (n-2)!}$$

unique pairs can be created.

With three available modules (#1, #2, #3), $C_{3,2}=3$ unique ranging measurements can be taken: (#1-#2), (#1-#3), (#2-#3). No redundancy is available in for a target outside the 3-sensor plane.

With four available modules, $C_{4,2}=6$. Three extra measurements are available. These can either be used to improve accuracy, or specific module-pairs can be chosen to maximize accuracy in the first place.

In the case where a particular location is either permanently configured as a TX-only or RX-only module, at least a total of N TX/RX combinations are necessary (e.g. (n RX)*(m TX) N). Here again, additional RXs and/or TXs can improve the target location accuracy result by averaging.

Figure 8:
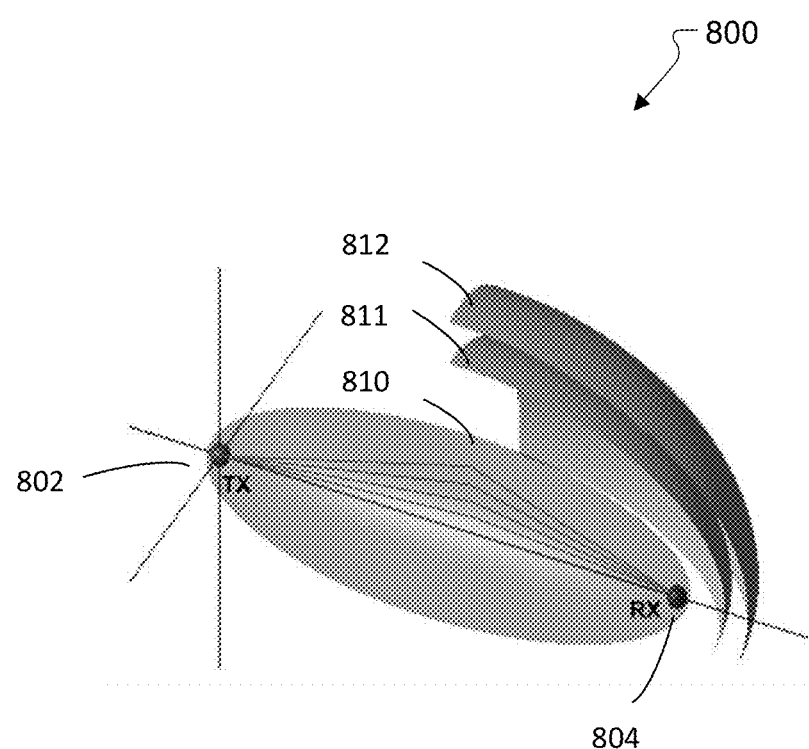
FIG. 8 illustrates an exemplary diagram showing how to determine possible target locations in mm-wave communication systems, using 3 dimensional (3-D) ellipsoids according to one embodiment of this disclosure.

FIG. 8 illustrates an exemplary diagram showing how to determine possible target locations in mm-wave communication systems, using 3 Dimensional (3D) ellipsoids according to one embodiment of this disclosure. The embodiment shown in FIG. 8 is for illustration only. Other embodiments are used without departing from the scope of this disclosure.

The transmitter 802 sends out a signal that is reflected by the target and subsequently acquired by one of the receivers 804. The signal path from the transmitter 802 via the target reflection to a receiver traces out an ellipsoidal surface for the possible target locations, with the TX and RX positions as the foci. Multiplication of the measured time delay with propagation velocity provides the bistatic range for the respective TX/RX pair. The intersection of the respective ellipsoids from several transmit-receive pairs yields the object location estimate.

Possible target locations are placed anywhere on the surface of a 3D ellipsoid 810, generated by the rotation of an ellipse around its major axis. All have the same propagation path length between TX 802 and RX 804 at the foci of the ellipsoid 810. For larger bistatic range values, the ellipsoid 810 expands as illustrated by ellipsoids 811 and 812.

With many targets present, the elimination of false targets becomes challenging. Each target generates one ellipse for each TX-RX pair. If N=(n*m) TX/RX pairs are used (=# measurements taken) and K targets are present then we have (NK*(N−1)K)/2 intersections, of which only K correspond to actual targets. For instance, in a modest case of N=3, K=5, we will have 75 total positions out of which only 5 correspond to the real targets. Therefore, this method is useful for a low number of targets, such as a single user or a user's hand in proximity to the device.

Figure 9:
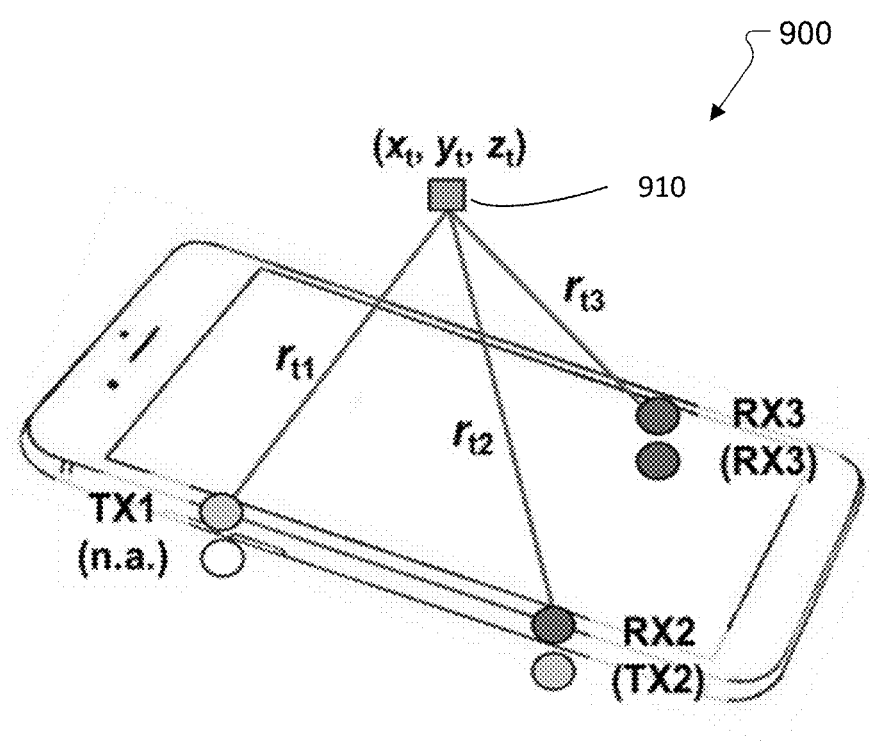
FIG. 9 illustrates an exemplary time-of-arrival bistatic radar ranging geometry for three configurable TX/RX modules according to one embodiment of this disclosure.

FIG. 9 illustrates an exemplary time-of-arrival bistatic radar ranging geometry for three configurable TX/RX modules according to one embodiment of this disclosure. The embodiment shown in FIG. 9 is for illustration only. Other embodiments are used without departing from the scope of this disclosure.

Minimally, three configurable TX/RX modules are needed to find the target's 3D position 910 at the intersection of the ellipses. Consider the geometry in FIG. 9. The first two measurements are taken with module 1 as TX (TX1), modules 2 & 3 as RX (RX2, RX3). In the $3^{rd}$ measurement, module 1 can be disabled, module 2 is TX and module 3 is RX.

The measurements yield three bistatic ranges: $r_{12}=(r_{t1}+r_{t2})$, $r_{13}=(r_{t1}+r_{t3})$, $r_{23}=(r_{t2}+r_{t3})$, which yields the individual module-to-target distances: $r_{t1}=(r_{12}+r_{13}-r_{23})/2$, $r_{t2}=(r_{12}-r_{13}+r_{23})/2$, $r_{t3}=(-r_{12}+r_{13}+r_{23})/2$, and together with the module locations $[x_i, y_i, z_i]$, (i=1 . . . 3), the target location is found by solving: $r_{ti}^2=(x_i-x_t)^2+(y_i-y_t)^2+(z_i-z_t)^2$ for $[x_t, y_t, z_t]$.

Figure 10:
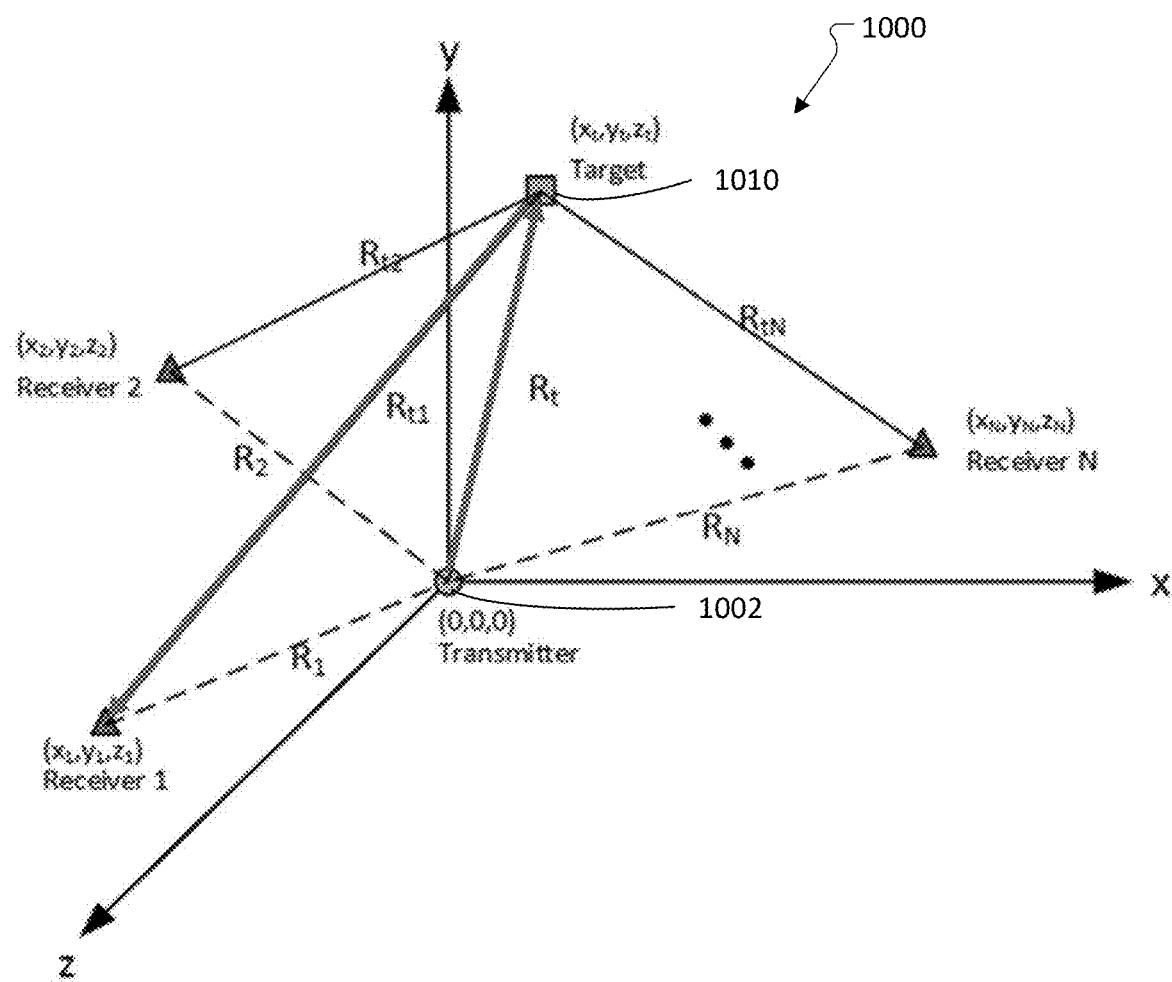
FIG. 10 illustrates another exemplary time-of-arrival bistatic radar ranging geometry 100 for three configurable TX/RX modules according to one embodiment of this disclosure.

FIG. 10 illustrates another exemplary time-of-arrival bistatic radar ranging geometry 100 for three configurable TX/RX modules according to one embodiment of this disclosure. The embodiment shown in FIG. 10 is for illustration only. Other embodiments are used without departing from the scope of this disclosure.

With more than three modules, $N=C_{n,2}>3$ unique range measurements are possible. Consider the system geometry shown in FIG. 10. The time-of-arrival bistatic radar ranging geometry 100 include one TX at the origin 1002.

The i-th receiver is located at known position $x_i=[x_i, y_i, z_i]^T$, (i=1 . . . N) and the target is located at $x_t=[x_t, y_t, z_t]^T$. The bistatic range $R_{bi}$ for the i-th receiver (the measured variable) is the sum of transmitter-target and target-receiver distances $(R_t+R_{ti})$:

$$R_{bi}=R_t+R_{ti}=\sqrt{x_t^2+y_t^2+z_t^2}+\sqrt{(x_i-x_t)^2+(y_i-y_t)^2+(z_i-z_t)^2} \quad (1)$$

After rearranging:

$$x_i x_t + y_i y_t + z_i z_t - R_{bi}R_t = (x_i^2+y_i^2+z_i^2-R_{bi}^2)/2 \quad (2)$$

The unknowns in this equation are $x_t$ and $R_t$. For all ToAs ($R_{bi}$'s) at the receivers, in matrix form:

$$A_b x_b = b_b$$

$$A_b = \begin{bmatrix} x_1 & y_1 & z_1 & -R_{b1} \\ \vdots & \vdots & \vdots & \vdots \\ x_N & y_N & z_N & -R_{bN} \end{bmatrix}_{N \times 4},$$

$$x_b = [\, x_t \;\; y_t \;\; z_t \;\; R_t \,]^T,$$

$$b_b = \frac{1}{2} \begin{bmatrix} x_1^2 + y_1^2 + z_1^2 - R_{b1}^2 \\ \vdots \\ x_N^2 + y_N^2 + z_N^2 - R_{bN}^2 \end{bmatrix}_{N \times 1}.$$

The approximate (in least-squares sense) solution for the target location $x_t$ is now obtained as:

$\hat{x}_b = A_b^+ b_b$, where: $A_b^+ = (A_b^T A_b)^{-1} A_b^T$ is the pseudoinverse of $A_b$ and:

$$\hat{x}_t = [\, \hat{x}_t \;\; \hat{y}_t \;\; \hat{z}_t \,]^T = \begin{bmatrix} 1 & 0 & 0 & 0 \\ 0 & 1 & 0 & 0 \\ 0 & 0 & 1 & 0 \end{bmatrix} \hat{x}_b.$$

With that, the target position $x_t$ is known in least-squares approximation. It is intuitive, that the error variance decreases with higher accuracy range measurements $R_{bi}$ (better signal/noise ratio), more favorable RX vs. TX placements (which lead to ellipsoids intersecting at larger angles), and favorable target distances (which are on the order of up to a few TX/RX spacings).

In case wave propagation for particular TX/RX pair(s) is obstructed, other pairs may be selected from the total available set of $C_{n,2}$ combinations. 3-D target location can be determined as long as at least three measurements are possible as shown below.

In the Time-Difference-of-Arrival (TDoA) method, multiple synchronized receiver stations at different and known spatial coordinates collect the signal emitted or reflected off a target. Here, the mutual differences between arrival times of the signals at pairs of receivers are measured.

The process of finding the target position is similar to the previous case, with the difference that time delays are measured relative to a reference receiver (we choose RX 1 as the reference, arbitrarily).

The i-th receiver is located at known position $x_i = [x_i, y_i, z_i]^T$, (i=1 ... N) and the target is located at $x_t = [x_t, y_t, z_t]^T$. The measured range-difference $d_{i,1}$ between the i-th receiver and $1^{st}$ (reference-) receiver is $d_{i,1} = R_{ti} - R_{t1}$. After rearranging the expression for $R_{ti}^2 - R_{t2}^2$ we get an expression similar to the ToA case:

$$(x_i - x_1)x_t + (y_i - y_1)y_t + (z_i - z_1)z_t + d_{i,1} R_{t1} = (R_i^1 - R_1^2 - d_{i,1}^2)/2$$

The unknowns in this equation are $x_t$ and $R_{t1}$. For all N−1 TDoAs ($d_{i,1}$'s), in matrix form:

$$A_d x_d = b_d$$

$$A_d = \begin{bmatrix} x_2 - x_1 & y_2 - y_1 & z_2 - z_1 & d_{2,1} \\ \vdots & \vdots & \vdots & \vdots \\ x_N - x_1 & y_N - y_1 & z_N - z_1 & d_{N,1} \end{bmatrix}_{(N-1) \times 4},$$

$$x_d = [\, x_t \;\; y_t \;\; z_t \;\; R_{t1} \,]^T, \; b_d = \frac{1}{2} \begin{bmatrix} R_2^2 - R_1^2 - d_{2,1}^2 \\ \vdots \\ R_N^2 - R_1^2 - d_{N,1}^2 \end{bmatrix}_{(N-1) \times 1}.$$

The approximate (in least-squares sense) solution for the target location $x_t$ is now obtained as:

$\hat{x}_d = A_d^+ b_d$, where: $A_d^+ = (A_d^T A_d)^{-1} A_d^T$ is the pseudoinverse of $A_d$ and:

$$\hat{x}_t = [\, \hat{x}_t \;\; \hat{y}_t \;\; \hat{z}_t \,]^T = \begin{bmatrix} 1 & 0 & 0 & 0 \\ 0 & 1 & 0 & 0 \\ 0 & 0 & 1 & 0 \end{bmatrix} \hat{x}_d.$$

Again, the target position $x_t$ is known in a least-squares approximation. Note that the TDoA method requires one more receiver than the ToA method (N+1 receivers yield N TDoAs).

It is to be expected that the error variance in the TDoA method is larger than in the direct ToA-measurement method since the time-difference measurement may contain more measurement noise than the direct time measurement data. This is also shown in simulation in [10] and we remark that direct time measurement is preferable.

Mobile communications devices (e.g., smart phones) are starting to include mmW-communications capability, either in the 5G mm-wave bands at 28 GHz, 39 GHz, or in the 60 GHz ISM band. There are a few major aspects that govern the product design for this capability as follows.

1. For fundamental reasons of link quality, radios that operate at frequencies well above 10 GHz need more than one antenna element. Electronically controlled (1D- or 2D-) arrays of antenna elements, spaced at a typical λ/2 distance between the elements are a popular choice, as they can simultaneously focus the electromagnetic radiation into a beam and allow for the directional steering of this beam. For reference, λ=1 cm at 30 GHz.

2. Electromagnetic radiation in the 10's GHz range does not penetrate biological tissue for all but the outermost layer of the skin (to about 1 mm depth). Smartphones are handheld devices. Hence, when an antenna (an antenna element or antenna array) is covered e.g. by the hand when holding the device, that antenna is shielded and can no longer be used for communications. As a result, smartphones will include a number of antennas (or antenna arrays) across the extent of the device to enhance the probability of having at least one uncovered antenna (or antenna array) available. A typical design could use 4 arrays along the 4 edges of the device.

3. Smartphones have very limited space to add large antenna arrays. Due to the thin mechanical design, arrays are limited to 1D-linear arrays. The available space limits the antenna count per array to something on the order of 1×4 elements. This, in turn, limits the achievable beamforming effect. Optimistically, the angular beam width from an array with N elements in a particular direction would be 100 deg./N in that direction, i.e. only 25 deg. from 4 elements.

4. Modern radar implementations scan azimuth and elevation angles by beamforming, mostly done in the digital domain. Angular resolution will be limited by the small arrays.

5. Bi-directional communications in the 10's GHz range is done in time-division-duplex (TDD) mode for practical reasons of antenna, filter, and circuit design constraints as well as overall power consumption. As a result, any one particular RF module will be either in transmit or receive mode (or off). Both modes are mutually exclusive by construction.

Hence, the disclosed embodiments are to make use of the presence of a number of antennas and associated RF modules to improve on the ranging performance relative to what can be obtained with one module only, as is customarily done in the prior art.

Figure 11:
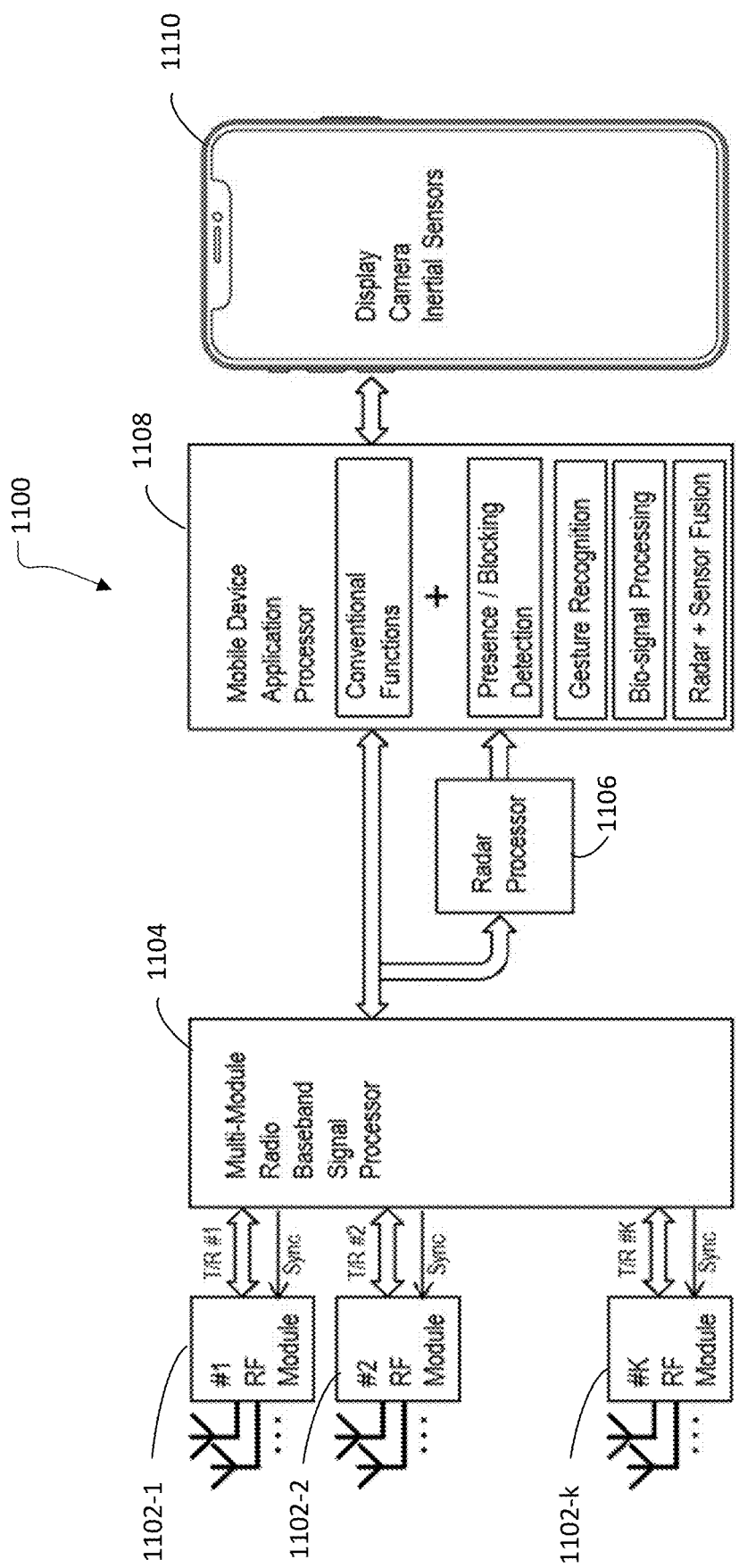
FIG. 11 illustrates an exemplary block diagram of multi-RF ranging apparatus according to embodiments of this disclosure.

FIG. 11 illustrates an exemplary block diagram of multi-RF ranging apparatus according to embodiments of this disclosure. The embodiment shown in FIG. 11 is for illustration only. Other embodiments are used without departing from the scope of this disclosure.

The ranging methods provided in the disclosure may be incorporated in mobile communications devices as shown in the block diagram of FIG. 11. Variations and extensions may be readily apparent to those skilled in the art.

A mobile device with mm-wave communications ability contains a number of RF modules 1102-1, 1102-2, . . . 1102-K. The modules may or may not be identical. Without loss of generality, we assume here that the modules communicate in the same RF frequency band or have the capability to operate in the respective other modules' frequency band(s). Each of the modules contains at least one antenna. Module level antenna arrays with more than one element are common and a preferred solution for communications. Antenna arrays allow beam forming and -steering, which is, however, not a requirement for the disclosed ranging system.

At least 3 antenna modules (K=3) modules may be required to determine the location of close-by reflecting targets in 3-dimensional coordinates. The mm-wave enabled mobile devices may typically be equipped with four RF modules, which allows for one to be blocked (e.g. covered by the user's hand) while still retaining the ranging capability. The modules share a common time reference as indicated by the sync signal in the block diagram. For time-of-arrival (ToA) processing, the radar returns are measured relative to a common Sync signal which is generated in the radio baseband signal processing block as shown. For time-difference-of-arrival (TDoA) processing, RF modules may be required to be synchronized in a pair-wise fashion, which can be achieved without an explicit synchronization signal from the baseband unit. In any case, due to the physical close-ness within the mobile device, it will be advantageous to provide a common sync-to-baseband signal.

RF modules are assumed to contain at least all required mm-wave circuitry and can be configured alternately in exclusive transmit or exclusive receive modes. Simultaneous transmit and receive capability is not required for the disclosed ranging methods but can be used advantageously if available as a result of the communications capabilities. Challenges due to limited transmit/receive isolation within one module will need to be overcome.

The interface between the RF modules and the radio baseband processing device may be analog or digital, depending on the location of the receiver analog-to-digital converters (ADC's) and transmitter digital-to-analog converters (DAC's). In either case, the receive signal at this interface contains sufficient (amplitude, phase, timing, and the like) information to extract the necessary radar parameters (delay, amplitude, phase, frequency, Doppler shift, and the like) on a per-module basis. Moreover, the interface carries transmit signal information on a per-module basis, per the particular receive/transmit mode configuration of the entire set of modules.

The baseband signal processor block 1104 customarily provides standards-based communications modem functions such as media access control (MAC), physical layer (PHY) interface functions, TX waveform generation based on required uplink data and RX demodulation to provide downlink data. In a communications-only device, the up- & downlink data paths terminate in an applications processor that may execute or manage all other functions of the mobile device, other than the modem functions.

The ranging system includes a radar processor block 1106. No constraint exists regarding the physical location of this block—it may be a stand-alone device or may be integrated either in the radio baseband processor or applications processor block (most likely it will be in the radio baseband, however), or consist of software functions only, re-utilizing existing hardware. The functions of the radar processor block 1106 include configuring the RF modules in the sequence required for the ranging function, taking into account previously gathered information regarding blocked and available modules, generating appropriate "radar time intervals" as dedicated radar-only intervals, interleaved with communications operation, or re-using native communications transmit time slots, generating appropriate "radar waveforms" for transmission during radar intervals (these may be dedicated waveforms, or reuse native communications waveforms), extracting raw radar parameters from the receive signals, executing radar processing, and delivering time-stamped, reflection-strength and likelihood-tagged lists of identified targets at a desired frame-rate to the device's application processor.

In effect, this adds an additional sensor to the mobile device, whereby part or all of the sensor hardware is re-used from the available communications hardware.

The applications processor 1108 combines the various communications, sensor, and user input data sources received from a mobile device 1110 to form a useful device function. Radar-related applications such as the aforementioned presence & blocking detection, gesture recognition, bio-signal processing, and radar+other-sensor signal fusion will be executed on this processor as software functions. Advantages to the usability, desirability and marketability of the device may be derived from the inclusion of the radar ranging feature.

The disclosure utilizes transmitter-receiver pairs for ranging, whereby the respective transmitter and receiver are on physically separate RF modules, using separate antennas or antenna arrays.

The RF modules are mounted at known positions and thereby the positions of the antennas (or antenna arrays) phase centers can be known. Using disjoint transmitter (TX) and receiver (RX) locations for ranging is known as multi-static radar.

Starting with one reflecting or scattering target in the proximity, one TX-RX pair (e.g. TX1-RX2) can resolve the signal's time-of-flight along the TX—a target object(s)—RX path. This constrains the target location onto the surface of an ellipsoid where the phase centers of the TX, RX antenna (arrays) are at the foci of the ellipsoid. In other words, a first-TX/RX-pair measurement reduces the target location from a 3D unknown to a 2D unknown.

Also, slightly more information can be available when the antenna radiation patterns are also known. In that case, the target location may be constrained to areas of the ellipsoid surface that are illuminated by the transmit antenna or that is in the field of view of the receive antenna.

In cases where only one TX-RX pair is available, this antenna-pattern-constrained area on the ellipsoid may be the only ranging information available. Since it is not possible to resolve angular information beyond that, a maximum-likelihood estimate of the target position may be chosen to be the center of the illuminated area on the ellipsoid. The directions of peak antenna pattern intensity are typically well known by lab characterization during the mobile device development and stored in the device's non-volatile memory (referred to a code book). Hence this information is readily available.

Also, the strength of the reflected signal for a single measurement is, in general, not a good indication of the target location as it is affected by distance, radar cross section, and angular position relative to the antennas' radiation patterns.

In most cases, however, the antenna beams may be steerable, e.g. via phase steering of the individual elements in the TX, RX, or both arrays. A refinement of the position information may be obtained by observing changes in the received signal strength while changing beam steering direction settings (sweeping through the code book). Since the sweep may be accomplished within a short time interval relative to changes in the target position, the code book setting that results in the largest reflected signal strength gives an improved indication of the angular target location, while the increased number of radial distance measurements can improve the target distance estimate.

Figure 12A:
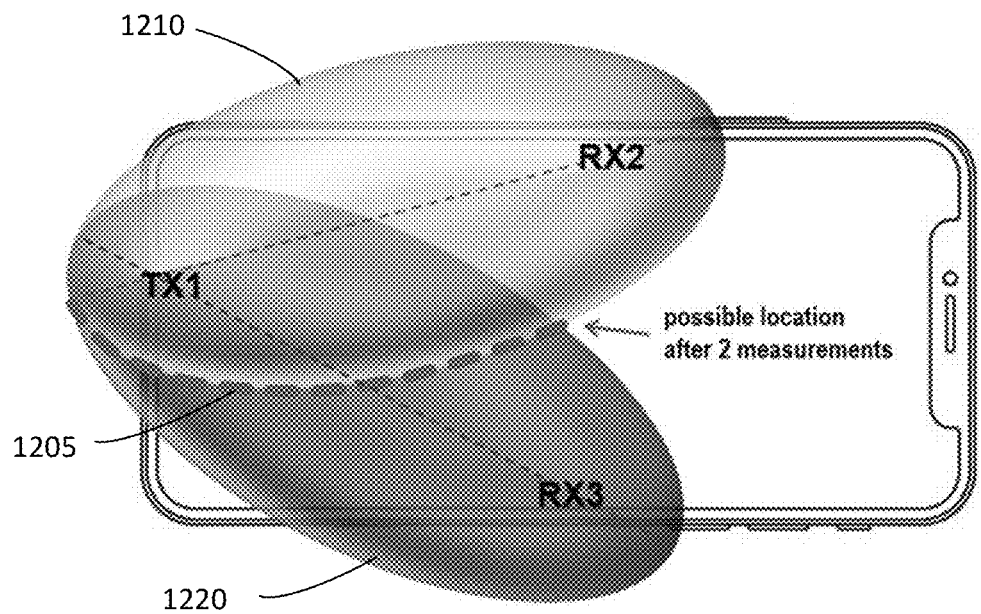
FIG. 12A illustrates an exemplary diagram showing how to determine a possible target location, using two independent measurements according to embodiments of this disclosure.

FIG. 12A illustrates an exemplary diagram showing how to determine a possible target location, using two independent measurements according to embodiments of this disclosure. The embodiment shown in FIG. 12A is for illustration only. Other embodiments are used without departing from the scope of this disclosure.

Figure 12B:
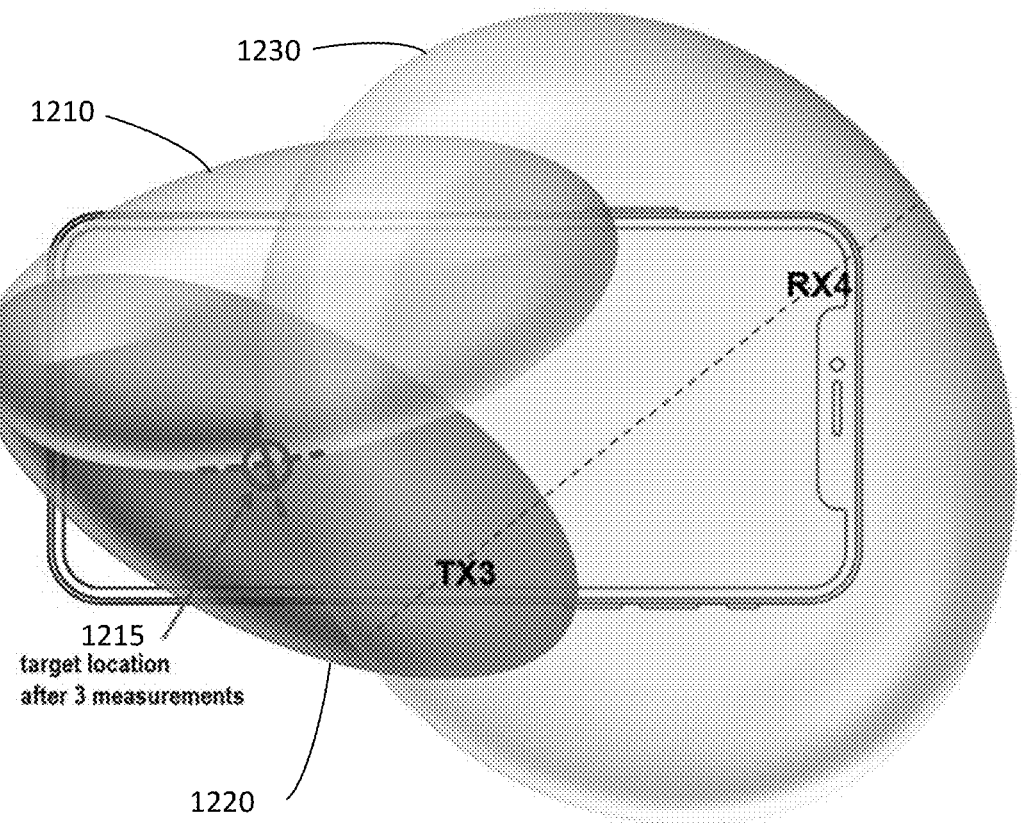
FIG. 12B illustrates another exemplary diagram showing how to determine a possible target location, using three independent measurements according to embodiments of this disclosure.

A first independent measurement using a pair of TX1 and RX2 constrains the target onto the surface of a first ellipsoid 1210, and a second independent measurement using a pair of TX1 and RX3 constrains the target onto the surface of a second ellipsoid 1220. Here, the TX and RX antennas are installed in different locations within the housing of a UE to provide adequate spatial resolutions. Taken together with the first and the second ellipsoids 1210 and 1220, the target object is determined be located on the intersection path 1205 of the two ellipsoids 1210 and 1220, i.e. on a one-dimensional path. Also, in this case where only two TX-RX pair are available, the antenna-pattern-constrained area on the 1-D path may be the most ranging information available. Again, a maximum-likelihood estimate of the target position may be chosen to be the combined center of the illuminated area on the 1-D path. A further refinement of the position information may be obtained also in this case by observing changes in the received signal strength while changing beam steering direction settings. FIG. 12B illustrates another exemplary diagram showing how to determine a possible target location, using three independent measurements according to embodiments of this disclosure. The embodiment shown in FIG. 12B is for illustration only. Other embodiments are used without departing from the scope of this disclosure.

With the first independent measurement using a pair of TX1 and RX2 and a second independent measurement using a pair of TX1 and RX3, a third independent measurement yields a unique point for the target location. The target object is located on an intersection point 1215 of the three ellipsoids 1210, 1220 and 1230

It is apparent from the schematic drawings that best accuracy will be achieved when the ellipsoids intersect at large angles in the vicinity of the target location. As the distance between the device and target increases, the ellipsoids will degenerate into spheres, intersect angles approach zero and intersect paths/points become very inaccurate. In that case, the method has to revert back to conventional radar operation, extracting radial distance from the radar response and angular (azimuth, elevation) information from the available beamforming capability of the modules. It may be possible to generate a set of (distance, azimuth, elevation) triplets from the individual radar modules to compute an improved target location estimate, particularly taking advantage of the differing antenna patters of the modules in different locations on the device.

Figure 13A:
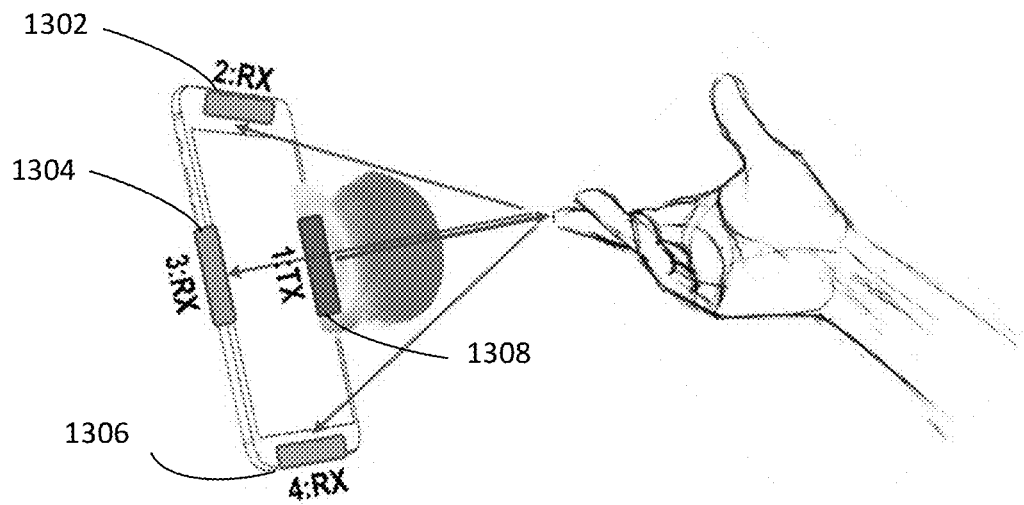
FIG. 13A illustrates an exemplary 3-D ranging operation with simultaneous measurements at 3 RX antennas in the mm-wave communication apparatus according to embodiments of this disclosure.

FIG. 13A illustrates an exemplary 3-D ranging operation with simultaneous measurements at 3 RX antennas in the mm-wave communication apparatus according to embodiments of this disclosure. The embodiment shown in FIG. 13A is for illustration only. Other embodiments are used without departing from the scope of this disclosure.

In the embodiments above, module #3 was used as RX during the first set of measurements as illustrated in FIG. 12A and as TX during the latter set of measurements in association with FIG. 12B. This will generally be the preferred mode for generating a sufficiently large set of measurements. For example, four independent measurements can be done in this manner: TX1-RX2, TX1-RX3, TX4-RX2, and TX4-RX3, which is a sufficient amount to use the least-squares method for calculation. TX and RXs can be swapped on a per-measurement basis if advantageous, based on the environment around the device.

Figure 13B:
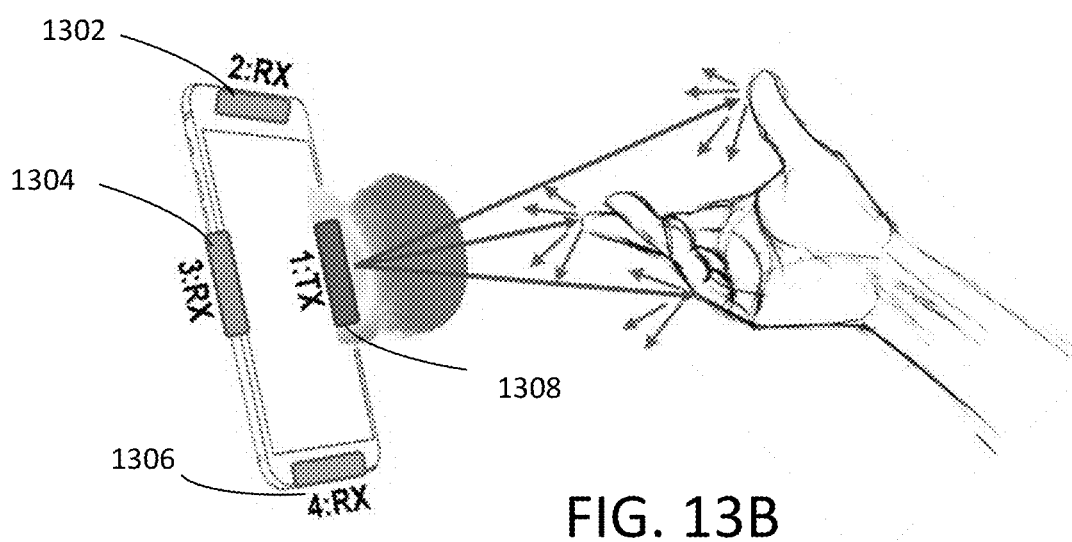
FIG. 13B illustrates an exemplary 3-D ranging operation through simultaneous measurements with 3 RX antennas in the mm-wave communication apparatus according to embodiments of this disclosure.

FIG. 13B illustrates an exemplary 3-D ranging operation through simultaneous measurements with 3 RX antennas in the mm-wave communication apparatus according to embodiments of this disclosure. The embodiment shown in FIG. 13B is for illustration only. Other embodiments are used without departing from the scope of this disclosure.

The least-squares method also produces a solution in the presence of noise or otherwise perturbed measurement data at the expense of additional measurements. Note that rarely there will be only one target but rather a cluster of closely spaced, not (easily) resolvable targets, which contributes to measurement "noisiness".

Figure 14A:
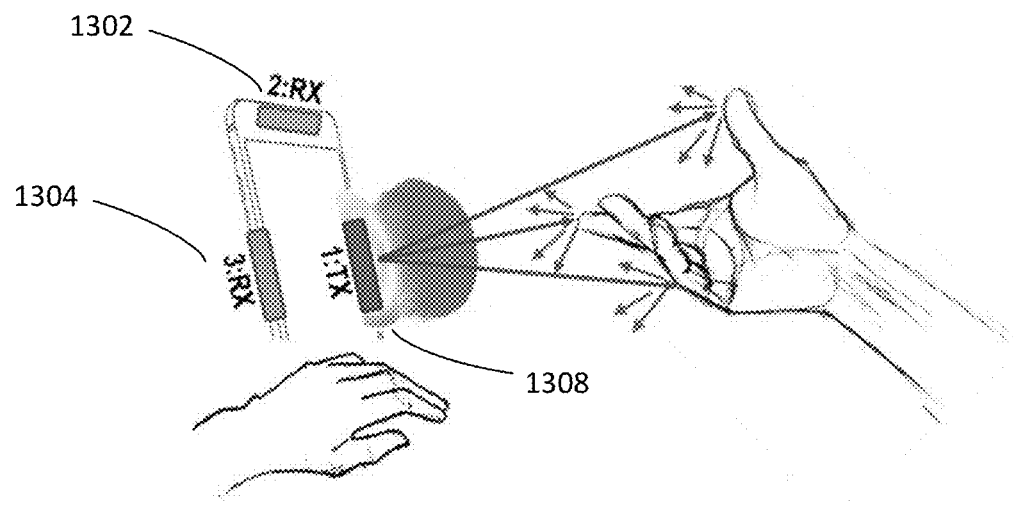
FIGS. 14A and 14B illustrate three measurements with three RF modules when the 4-th RF module is covered by an obstruction according to one embodiment of this disclosure.
Figure 14B:
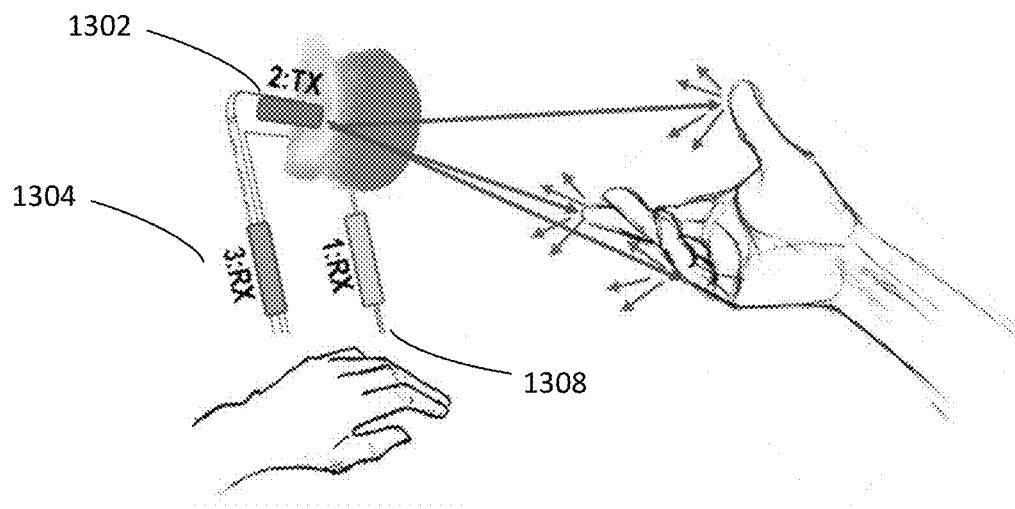

FIGS. 14A and 14B illustrate three measurements with three RF modules when the 4-th RF module is covered by an obstruction according to one embodiment of this disclosure. The embodiments shown in FIG. 14A to 14B are for illustration only. Other embodiments are used without departing from the scope of this disclosure.

As a result of fundamental properties of electromagnetic signal reflections at dielectric boundaries such as the air-skin interface, the strength of the reflected signal will depend on the incident angle as well as the polarization of the signal. Generally, polarizing the signal such that the electric field vector is perpendicular to the plane of propagation will yield a stronger reflection. In case the signal is polarized such that the electric field vector is parallel to the plane of propagation, there exists a particular incident angle that exhibits no reflection at all (known as the Brewster angle).

Since the position and orientation of the target object (and therefore the plane of propagation) at the time of measurement are not known, it may be advantageous to perform measurements at various combinations of TX and RX polarizations to select the strongest return, average the returns based for improved accuracy, and the like.

Each TX antenna and each RX antenna are configured to form one of four pairs comprising a TX antenna transmitting the first polarized signal and an RX antenna receiving the first polarized signal, a TX antenna transmitting the first polarized signal and an RX antenna receiving the second polarized signal, a TX antenna transmitting the second polarized signal and an RX antenna receiving the first polarized signal, or a TX antenna transmitting the second polarized signal and an RX antenna receiving the second polarized signal.

For each TX-RX pair, four possibilities exist (TX for H and RX for H, TX for H and RX for V, TX for V and RX for H, or TX for V and RX for V), where H indicates a horizontal polarization, and V indicate a vertical polarization.

Figure 15:
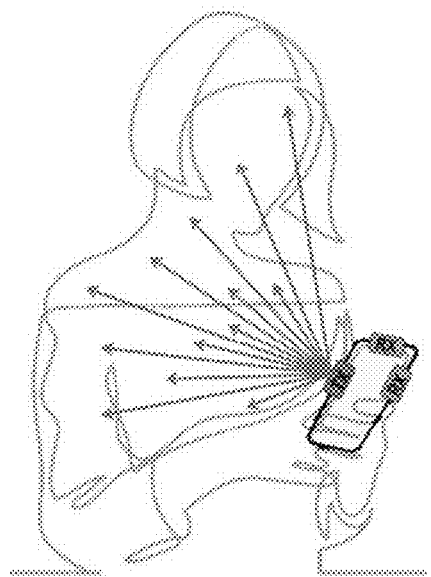
FIG. 15 illustrates an exemplary proximity detection for safety or user-convenience according to embodiment of this disclosure.

FIG. 15 illustrates an exemplary proximity detection for safety or user-convenience according to embodiment of this disclosure. The embodiment shown in FIG. 15 is for illustration only. Other embodiments are used without departing from the scope of this disclosure.

In one embodiment, the multi-communications module radar functionality is used to simply detect the presence of close-by reflecting objects. There are several motivations for this proximity detection.

First motivation is safety. Most of the energy in mm-wave beams when targeted at biological tissue is absorbed in the skin layer, causing local heating. Measurements have shown an approximate 1 degree C. relative skin-surface temperature increase per 10 mW/cm$^2$ power flux @ 60 GHz. This is also supported by simulations with established skin-layer models. Typical clothing does not provide a significant amount of shielding. Awareness in the device regarding the physical close-ness of a lively object (for example the user) allows the device to adapt its mm-wave transmit power in accordance with regulatory limits, also for the ongoing communications use case. This also prevents the device to employ the user's body as a reflector when determining a mm-wave signal path between itself and a communications base station (eNB).

Second motivation is the convenience functions of the mobile device, such that e.g. certain functions are activated when a user gets close, the device can enter a low power sleep mode when no user is present, or the device enters an alarm state when no user is present in the vicinity, e.g., mobile phone with separation anxiety, or the device may pause the playback of a movie when the user distance increases beyond a configurable distance, and the like.

In the ranging applications, if the radar detects a large range of targets over a wide angular spread, and the target distance is not stable over time (as would be the case in a static/non-lively environment), then an object is detected as live and proximate.

Figure 16A:
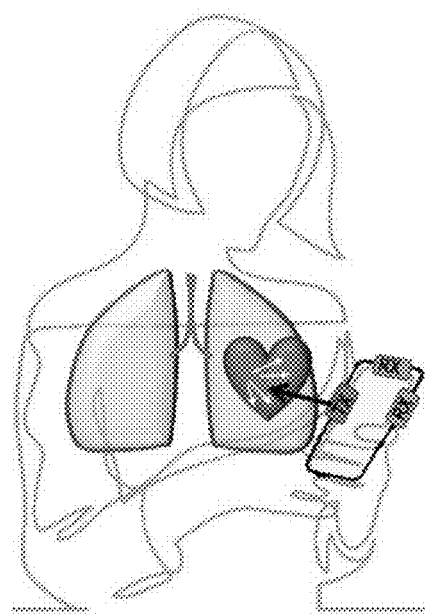
FIGS. 16A to 16C illustrates an exemplary bio-signal measurement and resultant graphs for heart and respiration rates according to embodiments of this disclosure.
Figure 16B:
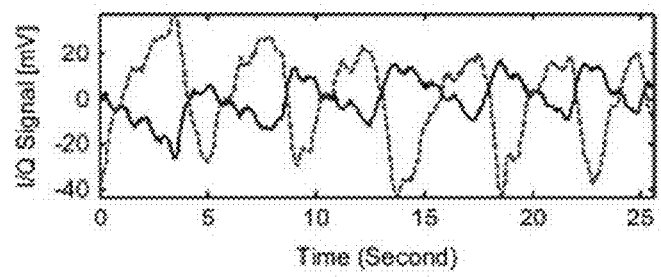
Figure 16C:
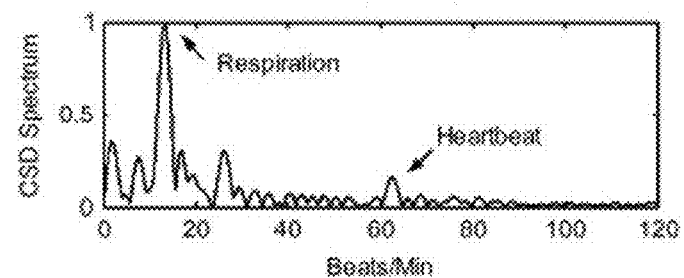

FIGS. 16A to 16C illustrate an exemplary bio-signal measurement and resultant graphs for heart and respiration rates according to embodiments of this disclosure. The embodiments shown in FIGS. 16A to 16C are for illustration only. Other embodiments are used without departing from the scope of this disclosure.

Human respiration rate is in the range 0.1 to 0.8 Hz with a chest deflection of 4 to 12 mm, typically. Human heart rate is in the range 0.8 to 2 Hz with 0.2 to 0.5 mm chest deflection. Since the frequency ranges are uniquely different, measurement of heart and respiration rates are possible in humans via radar ranging measurements. Range resolution well below one wavelength may be required even at 60 GHz, which is achieved by tracking the phase of the target responses. A chest deflection of 0.25 mm causes a 36-degree phase change for a 60 GHz reflected signal and is well detectable.

The radar methods described in this disclosure can equally be used for this type of detection. The major challenge with this application is the separation of whole-body movements from the heart beat and respiration signal, the latter being much smaller in displacement. With the measurement device being handheld, an additional challenge lies in compensating for its movements. This can, in principle, be done via the device's built-in acceleration sensors.

Figure 17A:
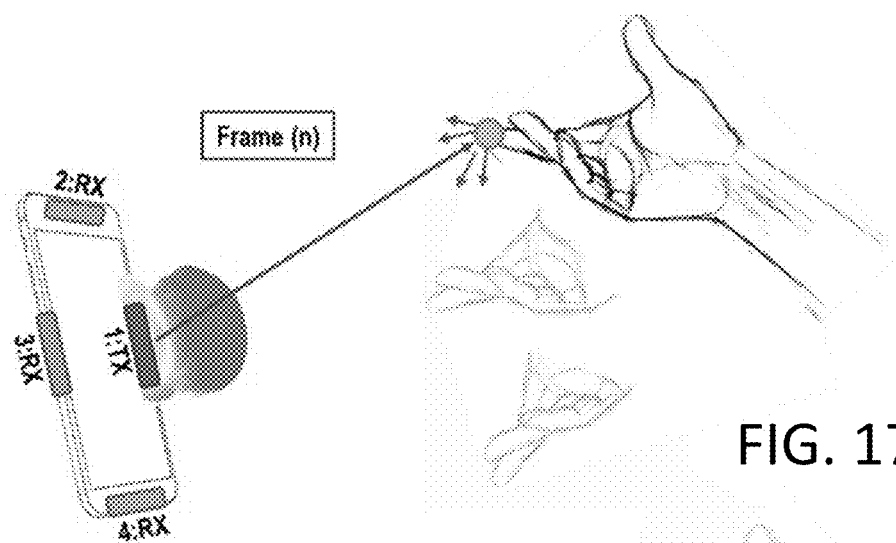
FIGS. 17A to 17C illustrates exemplary ranging update using frames in radar slow-time generating raw-data for gesture recognition according to embodiments of this disclosure.
Figure 17B:
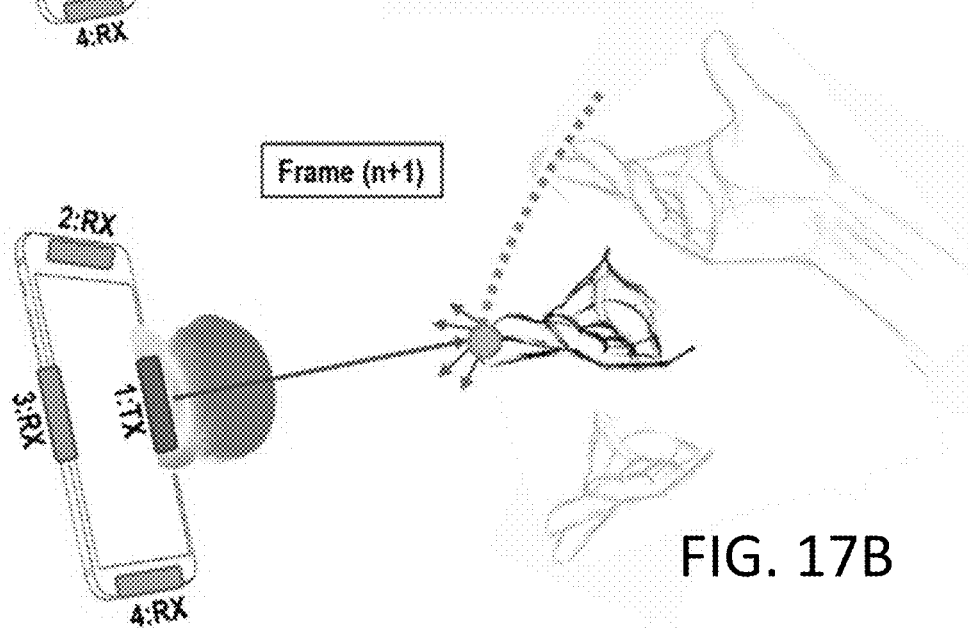
Figure 17C:
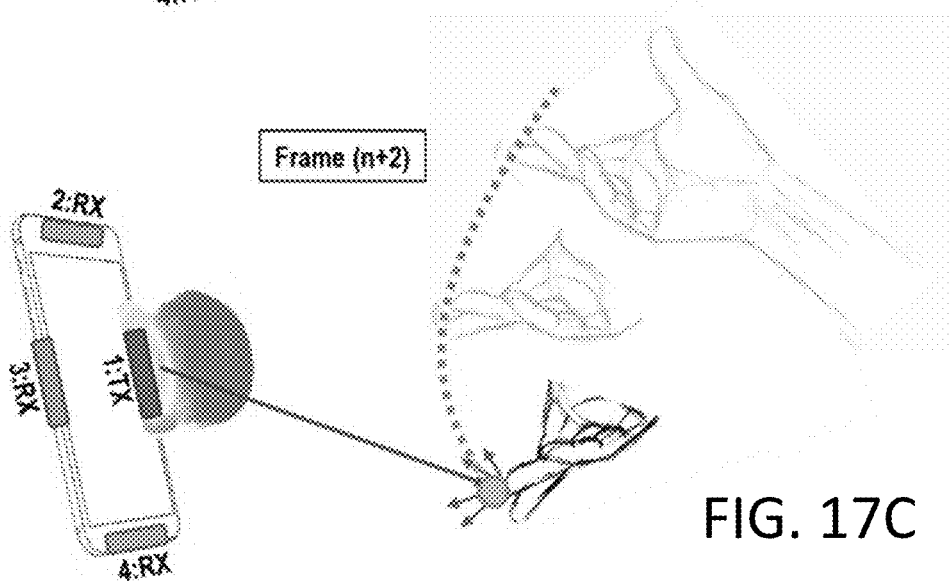

FIGS. 17A to 17C illustrates exemplary ranging update at frames in radar slow-time generating raw-data for gesture recognition according to embodiments of this disclosure. The embodiments shown in FIGS. 17A to 17C is for illustration only. Other embodiments are used without departing from the scope of this disclosure.

One of main purposes of this embodiment is to simplify and enhance the user interaction with the mobile device. As such, determining the location of a close-by object such as a hand, is the technological basis upon which higher level applications are built.

An underlying assumption for the ranging operation is that it is "fast" with respect to any relative location changes between the device and the target object(s). Since the radar signal's round-trip distance is very small compared to typical wireless communication distances, we expect large receiver signal-to-noise ratios during radar operation, requiring little averaging and as a result, allowing for short measurement periods. Since re-configuration of the modules between TX and RX modes can be done within microseconds, a full set of ranging measurements across all the required TX/RX pairs requires on the order of 10 µs to no more than 1 milli-second (ms). Hence, we consider the geometric arrangement and environment as static (frozen) for this time. This is often referred to as taking measurements in fast time.

Object tracking requires measurements in slow time, i.e., repeated location measurements within periodic or non-periodic time periods that sample the target object's trajectory. Slow time measurements may be done at a rate of 10 . . . 30 per second, yielding sufficient accuracy and low resource usage/power consumption in the radar subsystem (~0.1% duty cycle for 30 µs RF on-time at 30 fps update rate). Schematically, this operation can be seen in the sequence below. Over the course of 3 ranging operations at frames n, n+1, and n+2, a target trajectory segment is established. Note that smoothing may be required before further processing to suppress the effects of noise.

In a subsequent step, the time-stamped ranging measurements may be used as inputs to a classification algorithm to associate known trajectories (gestures) with the observed coordinate list. For a single dominant target, the ranging output may be a formatted list as shown below:

| Timestamp (n) | x(n) | y(n) | z(n) | RCS(n) | Prob(n) |
| --- | --- | --- | --- | --- | --- |
| Timestamp (n + 1) | x(n + 1) | y(n + 1) | z(n + 1) | RCS(n + 1) | Prob(n + 1) |
| Timestamp (n + 2) | x(n + 2) | y(n + 2) | z(n + 2) | RCS(n + 2) | Prob(n + 2) |
| ... | ... | ... | ... | ... | ... |

Here, Timestamp(n) marks the time at which the n-th measurement was taken, typically in units of "system ticks", x(n), y(n), z(n) are the observed target coordinates, RCS(n) is the apparent radar cross section, and Prob(n) is the likelihood of a true detection. In case several significant targets are detected, each time stamp may have several entries for location, RCS and detection probability.

Prob(n) is derived from the power in the radar reflection relative to a noise-floor estimate during raw radar signal processing. The closer the signal to the noise floor, the (exponentially) higher the likelihood for a false detection.

Hence, when Prob(n) falls below a threshold (e.g., 0.9), the data point may be discarded prior to classification.

Figure 18:
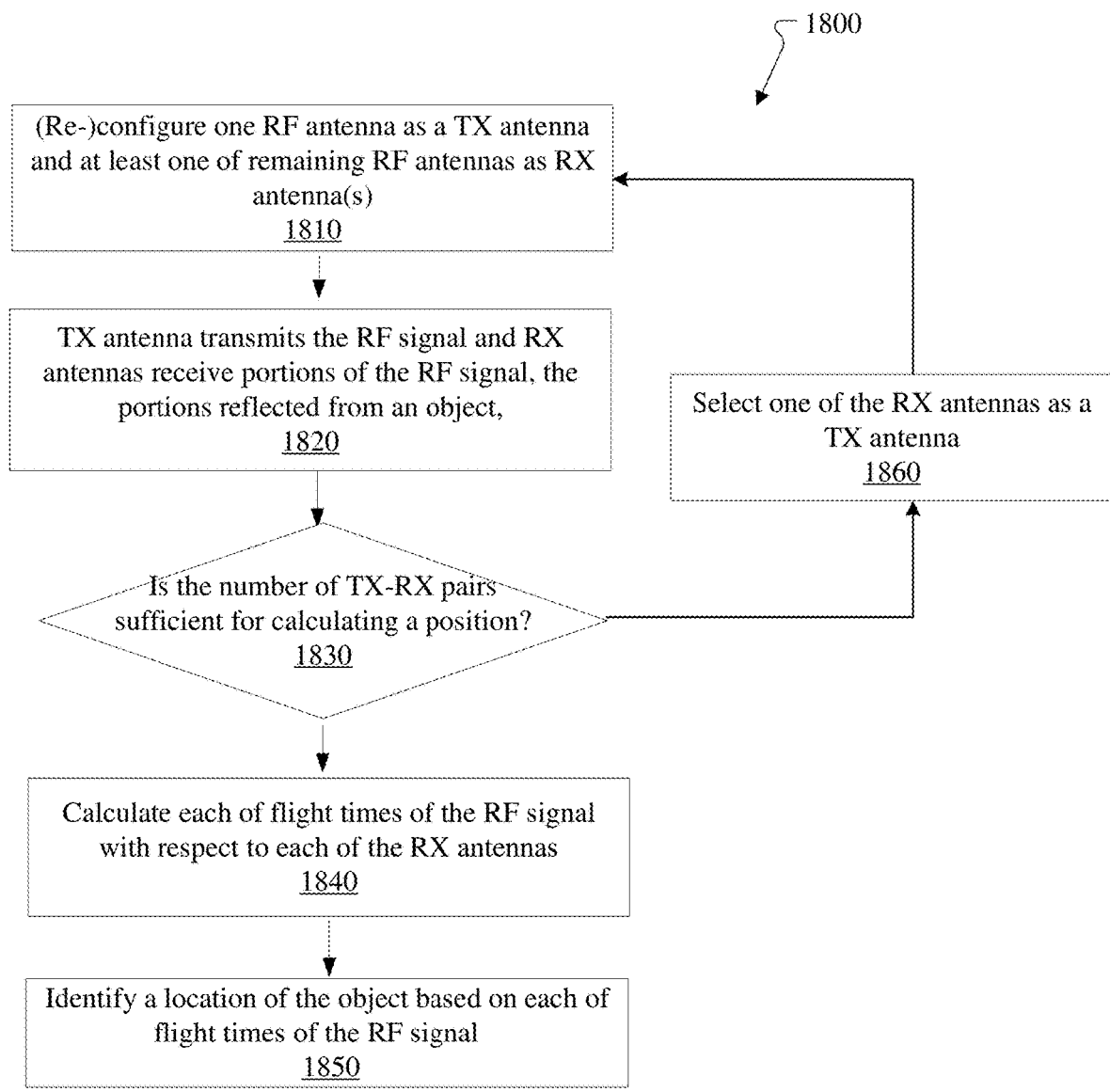
FIG. 18 illustrates an exemplary flowchart for ranging operations in the mm-wave communication apparatus according to embodiments of this disclosure.

FIG. 18 illustrates an exemplary flowchart for ranging operations in the mm-wave communication apparatus according to embodiments of this disclosure. The embodiment of the method 1800 shown in FIG. 18 is for illustration only. One or more of the components illustrated in FIG. 18 can be implemented in specialized processing circuitry configured to perform the noted functions or one or more of the components can be implemented by one or more processors executing instructions to perform the noted functions. Other embodiments are used without departing from the scope of this disclosure. For example, various components in FIG. 18 could be combined, further subdivided, or omitted and additional components could be added according to particular needs.

The mm-wave communication device includes a plurality of radio frequency (RF) antennas configured to transmit (TX) or receive (RX) mm-wave RF signals, and a processor coupled to the plurality of RF antennas. The device also includes a housing with a display, wherein the plurality of RF antennas is installed on different sides of the housing. The device further includes a sensor to determine an orientation of the apparatus. The device can include at least four RF antennas.

In operation 1810, the device configures at least one RF antenna, among the plurality of RF antennas, as a TX antenna and at least one of the remaining RF antennas as RX antenna(s).

In one embodiment, the processor determines an orientation of the device, and select one of the plurality of RF antennas as the TX antenna based on the orientation of the device. For example, the device is oriented in a portrait mode, the RF antenna on the top-short side can be configured as a TX antenna, and RF antennas on the other sides, such as the top-short side, and the top and bottom long sides, can be configured as RX antennas. Alternatively, the device is oriented in a landscape mode, the RF antenna on the top-long side can be configured as a TX antenna, and on the other sides, such as the bottom-long side, and the top and bottom short sides, can be configured as RX antennas.

In operation 1820, the TX antenna transmits the RF signal, and RX antennas receives portions of the RF signal, wherein the portions are reflected from an object. The RF signal can be an orthogonal frequency division multiplexing (OFDM) communication signal.

In operation 1830, the processor determines whether the number of TX-RX pairs is sufficient for calculating a position of a target object. For example, three TX-RX pairs will be sufficient for determining a 3-D target location, when using the least-squares method. If the number of TX-RX pairs is not sufficient for calculating a position of a target object, the processor proceeds to operation 1860; otherwise, proceeds to operation 1840.

In operation 1860, the processor selects a different RF antenna as a new TX antenna, among the RX antennas and then proceeds to operation 1810 to reconfigure the plurality of RF antennas.

In operation 1840, the device calculates each of flight times of the RF signal with respect to each of the RX antennas. The processor generates a plurality of ellipsoids, each ellipsoid with a first focus at the TX antenna and a second focus at each of the RX antennas.

In operation 1850, the processor determines the location of the object based on intersections of each ellipsoid.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An apparatus comprising:
   a plurality of radio frequency (RF) antennas configured to transmit (TX) or receive (RX) a RF signal; and
   a processor configured to:
      configure at least one RF antenna, among the plurality of RF antennas, as a TX antenna and at least one of the remaining RF antennas as an RX antenna,
      cause the TX antenna to transmit the RF signal,
      cause the RX antennas to receive portions of the RF signal, the portions reflected from an object,
      calculate each of flight times of the RF signal with respect to each of the RX antennas, and
      identify a location of the object based on each of flight times of the RF signal,
   wherein each of the plurality of RF antennas is reconfigurable as the TX antenna or the RX antennas.

2. The apparatus of claim 1, further comprising:
   a housing accommodating RF signal processing circuits, wherein the plurality of RF antennas is installed in different locations within the housing to provide an adequate spatial resolution.

3. The apparatus of claim 1, wherein the RF signal comprises one of two orthogonally polarized signals comprising a first polarized signal and a second polarized signal, and
   wherein the processor is configured to cause the TX antenna and the RX antennas to switch the RF signal between the first polarized signal and the second polarized signal to improve a reception quality of the reflected portions of the RF signal.

4. The apparatus of claim 3, wherein each TX antenna and each RX antenna are configured to form one of four pairs comprising:
   the TX antenna transmitting the first polarized signal and the RX antenna receiving the first polarized signal,
   the TX antenna transmitting the first polarized signal and the RX antenna receiving the second polarized signal,
   the TX antenna transmitting the second polarized signal and the RX antenna receiving the first polarized signal, or
   the TX antenna transmitting the second polarized signal and the RX antenna receiving the second polarized signal.

5. The apparatus of claim 1, wherein if a number of the RX antennas that succeed to receive the reflected portions of the RF signal is lower than a threshold value, the processor is further configured to reconfigure one of the RX antennas as a TX antenna.

6. The apparatus of claim 5, wherein the threshold value is three, and the location of the object is determined using three-dimensional coordinates.

7. The apparatus of claim 1, wherein the processor is further configured to:
   determine a plurality of ellipsoids, each ellipsoid with a first focus at the TX antenna and a second focus at each of the RX antennas, and
   determine the location of the object based on intersections of each ellipsoid.

8. The apparatus of claim 1, wherein the processor is further configured to:
   determine an angular location of the object based on antenna patterns of each of the RX antennas.

9. The apparatus of claim 1, wherein the RF signal comprises a millimeter-wave beam that is steered at a time interval, wherein a length of the time interval is adjustable to improve an angular position of the object.

10. The apparatus of claim 1, wherein the RF signal is an orthogonal frequency division multiplexing (OFDM) communication signal.

11. A method for operating a mobile device comprising a plurality of radio frequency (RF) antennas configured to transmit (TX) or receive (RX) a RF signal, the method comprising:
configuring at least one RF antenna, among the plurality of RF antennas, as a TX antenna and at least one of remaining RF antennas as an RX antenna,
causing the TX antenna to transmit the RF signal,
causing the RX antennas to receive portions of the RF signal, the portions reflected from an object,
calculating each of flight times of the RF signal with respect to each of the RX antennas, and
identifying a location of the object based on each of flight times of the RF signal,
wherein each of the plurality of RF antennas is reconfigurable as the TX antenna or the RX antennas.

12. The method of claim 11, wherein a housing accommodating RF signal processing circuits, wherein the plurality of RF antennas is installed in different locations within the housing to provide an adequate spatial resolution.

13. The method of claim 11, wherein the RF signal comprises one of two orthogonally polarized signals comprising a first polarized signal and a second polarized signal, the method further comprising causing the TX antenna and the RX antennas to switch the RF signal between the first polarized signal to the second polarized signal to improve a reception quality of the reflected portions of the RF signal.

14. The method of claim 13, wherein each TX antenna and each RX antenna are configured to form one of four pairs comprising:
the TX antenna transmitting the first polarized signal and the RX antenna receiving the first polarized signal,
the TX antenna transmitting the first polarized signal and the RX antenna receiving the second polarized signal,
the TX antenna transmitting the second polarized signal and the RX antenna receiving the first polarized signal, or
the TX antenna transmitting the second polarized signal and the RX antenna receiving the second polarized signal.

15. The method of claim 11, further comprising:
based on a number of the RX antennas that succeed to receive the reflected portions of the RF signal being lower than a threshold value, reconfiguring one of the RX antennas as a TX antenna.

16. The method of claim 15, wherein the threshold value is three, and the location of the object is determined using three-dimensional coordinates.

17. The method of claim 11, further comprising:
determining a plurality of ellipsoids, each ellipsoid with a first focus at the TX antenna and a second focus at each of the RX antennas; and
determining the location of the object based on intersections of each ellipsoid.

18. The method of claim 11, further comprising:
determining an angular location of the object based on antenna patterns of each of the RX antennas.

19. The method of claim 11, wherein the RF signal comprises a millimeter-wave beam that is steered at a time interval, wherein a length of the time interval is adjustable to improve an angular position of the object.

20. The method of claim 11, wherein the RF signal is an orthogonal frequency division multiplexing (OFDM) communication signal.

* * * * *